United States Patent
Kerr et al.

(10) Patent No.: US 7,800,592 B2
(45) Date of Patent: Sep. 21, 2010

(54) HAND HELD ELECTRONIC DEVICE WITH MULTIPLE TOUCH SENSING DEVICES

(75) Inventors: Duncan R. Kerr, San Francisco, CA (US); Steve Hotelling, Mountain View, CA (US); Brian Q. Huppi, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 925 days.

(21) Appl. No.: 11/115,539

(22) Filed: Apr. 26, 2005

(65) Prior Publication Data

US 2006/0197750 A1 Sep. 7, 2006

Related U.S. Application Data

(60) Provisional application No. 60/658,777, filed on Mar. 4, 2005.

(51) Int. Cl.
*G06F 3/41* (2006.01)
(52) U.S. Cl. ........................ 345/173; 345/178
(58) Field of Classification Search ......... 345/156–179, 345/467, 659, 184, 1.1; 715/864, 798, 856, 715/702, 863; 361/679–687, 724–727; 455/566, 455/575, 90, 558, 456.3; 341/21, 20; 463/10
See application file for complete search history.

(56) References Cited

U.S. PATENT DOCUMENTS

| | | | |
|---|---|---|---|
| 4,891,508 A * | 1/1990 | Campbell | 250/221 |
| 5,379,057 A | 1/1995 | Clough et al. | |
| 5,488,204 A | 1/1996 | Mead et al. | |
| 5,675,362 A | 10/1997 | Clough et al. | |
| 5,729,219 A * | 3/1998 | Armstrong et al. | 341/20 |
| 5,841,425 A * | 11/1998 | Zenz, Sr. | 345/163 |
| 5,880,411 A | 3/1999 | Gillespie et al. | |
| 6,049,328 A * | 4/2000 | Vanderheiden | 345/173 |
| 6,069,648 A | 5/2000 | Suso et al. | |
| 6,188,391 B1 | 2/2001 | Seely et al. | |
| 6,208,329 B1 * | 3/2001 | Ballare | 345/173 |
| 6,232,957 B1 * | 5/2001 | Hinckley | 345/156 |
| 6,323,846 B1 | 11/2001 | Westerman et al. | |
| 6,356,287 B1 * | 3/2002 | Ruberry et al. | 715/864 |
| 6,384,743 B1 * | 5/2002 | Vanderheiden | 341/21 |
| 6,559,831 B1 * | 5/2003 | Armstrong | 345/159 |
| 6,587,093 B1 * | 7/2003 | Shaw et al. | 345/163 |
| 6,624,803 B1 * | 9/2003 | Vanderheiden et al. | 345/156 |
| 6,816,149 B1 * | 11/2004 | Alsleben | 345/163 |

(Continued)

FOREIGN PATENT DOCUMENTS

JP 2004-340991 A 12/2004

(Continued)

OTHER PUBLICATIONS

International Search Report dated Jul. 25, 2006, from corresponding International Application No. PCT/US2006/007585 with Written Opinion.

(Continued)

*Primary Examiner*—Prabodh M Dharia
(74) *Attorney, Agent, or Firm*—Morrison & Foerster LLP

(57) ABSTRACT

Hand held devices with multiple touch sensing devices are disclosed. The touch sensing devices may for example be selected from touch panels, touch screens or touch sensitive housings.

12 Claims, 12 Drawing Sheets

U.S. PATENT DOCUMENTS

| | | | |
|---|---|---|---|
| 6,834,195 B2 * | 12/2004 | Brandenberg et al. | 455/456.3 |
| 6,847,352 B2 * | 1/2005 | Lantigua | 345/163 |
| 6,873,715 B2 * | 3/2005 | Kuo et al. | 382/119 |
| 6,943,779 B2 * | 9/2005 | Satoh | 345/173 |
| 7,034,802 B1 * | 4/2006 | Gettemy et al. | 345/156 |
| 7,068,256 B1 * | 6/2006 | Gettemy et al. | 345/156 |
| 7,312,981 B2 * | 12/2007 | Carroll | 361/683 |
| 7,366,995 B2 * | 4/2008 | Montague | 715/798 |
| 7,453,439 B1 * | 11/2008 | Kushler et al. | 345/168 |
| 7,505,785 B2 * | 3/2009 | Callaghan et al. | 455/557 |
| 7,663,607 B2 * | 2/2010 | Hotelling et al. | 345/173 |
| 2002/0118174 A1 * | 8/2002 | Rodgers | 345/163 |
| 2003/0063072 A1 * | 4/2003 | Brandenberg et al. | 345/173 |
| 2003/0095095 A1 | 5/2003 | Pihlaja | |
| 2003/0142855 A1 * | 7/2003 | Kuo et al. | 382/119 |
| 2003/0179223 A1 * | 9/2003 | Ying et al. | 345/702 |
| 2003/0234768 A1 | 12/2003 | Rekimoto et al. | |
| 2004/0003947 A1 * | 1/2004 | Kesselman et al. | 177/25.13 |
| 2004/0242295 A1 * | 12/2004 | Ghaly | 463/10 |
| 2004/0246231 A1 | 12/2004 | Large | |
| 2004/0263483 A1 * | 12/2004 | Aufderheide | 345/173 |
| 2005/0012723 A1 | 1/2005 | Pallakoff | |
| 2005/0043060 A1 * | 2/2005 | Brandenberg et al. | 455/558 |
| 2005/0068322 A1 * | 3/2005 | Falcioni | 345/467 |
| 2005/0084138 A1 * | 4/2005 | Inkster et al. | 382/115 |
| 2005/0115816 A1 * | 6/2005 | Gelfond et al. | 200/339 |
| 2005/0135053 A1 * | 6/2005 | Carroll | 361/683 |
| 2005/0168488 A1 * | 8/2005 | Montague | 345/659 |
| 2005/0190158 A1 * | 9/2005 | Casebolt et al. | 345/166 |
| 2005/0219228 A1 * | 10/2005 | Alameh et al. | 345/173 |
| 2005/0253818 A1 * | 11/2005 | Nettamo | 345/173 |
| 2006/0010400 A1 * | 1/2006 | Dehlin et al. | 715/856 |
| 2006/0026521 A1 * | 2/2006 | Hotelling et al. | 715/702 |
| 2006/0050011 A1 * | 3/2006 | Kamio | 345/1.1 |
| 2006/0097991 A1 * | 5/2006 | Hotelling et al. | 345/173 |
| 2006/0183505 A1 * | 8/2006 | Willrich | 455/566 |
| 2006/0197753 A1 | 9/2006 | Hotelling | |
| 2007/0063923 A1 * | 3/2007 | Koenig | 345/1.1 |
| 2007/0136064 A1 * | 6/2007 | Carroll | 704/254 |
| 2008/0238879 A1 * | 10/2008 | Jaeger et al. | 345/173 |
| 2008/0266257 A1 * | 10/2008 | Chiang | 345/163 |
| 2008/0297476 A1 * | 12/2008 | Hotelling et al. | 345/163 |
| 2009/0066670 A1 * | 3/2009 | Hotelling et al. | 345/174 |
| 2009/0085894 A1 * | 4/2009 | Gandhi et al. | 345/175 |
| 2009/0096757 A1 * | 4/2009 | Hotelling et al. | 345/173 |
| 2009/0096758 A1 * | 4/2009 | Hotelling et al. | 345/173 |
| 2009/0295738 A1 * | 12/2009 | Chiang | 345/173 |

FOREIGN PATENT DOCUMENTS

| | | | |
|---|---|---|---|
| WO | WO 03001576 A1 * | 12/2003 | 345/173 |
| WO | WO-2006/096501 A1 | 9/2006 | |

OTHER PUBLICATIONS

U.S. Appl. No. 10/188,182, entitled "Touch Pad for Handheld Device", filed Jul. 1, 2002.

U.S. Appl. No. 10/722,948, entitled "Touch Pad for Handheld Device", filed Nov. 25, 2003.

U.S. Appl. No. 10/643,256, entitled "Moveable Touch Pad with Added Functionality", filed Aug. 18, 2003.

U.S. Appl. No. 10/654,108, entitled "Ambidextrous Mouse" filed Sep. 2, 2003.

U.S. Appl. No. 10/903,964 entitled "Gestures for Touch Sensitive Input Devices", filed Feb. 13, 2002.

U.S. Appl. No. 11/038,590 entitled "Mode-based graphical user interfaces for touch sensitive input devices" filed Jan. 18, 2005.

U.S. Appl. No. 10/8075,964 entitled "Active Enclosure for Computing Device", filed Feb. 13, 2002.

U.S. Appl. No. 10/075,520 entitled "Computing Device with Dynamic Ornamental Appearance", filed Feb. 13, 2002.

U.S. Appl. No. 10/773,897 entitled "Active Enclosure for Computing Device", filed Feb. 6, 2004.

* cited by examiner

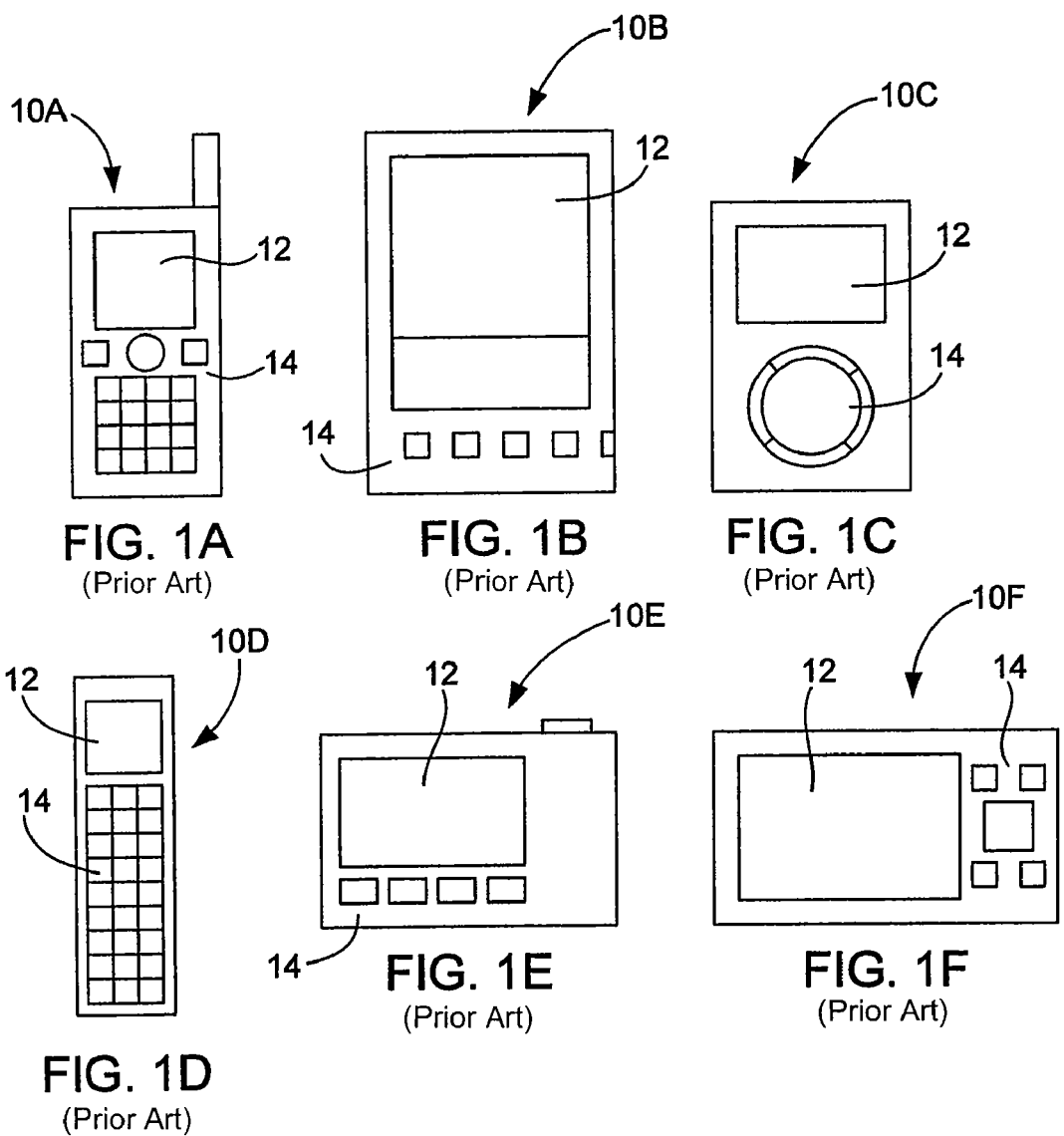

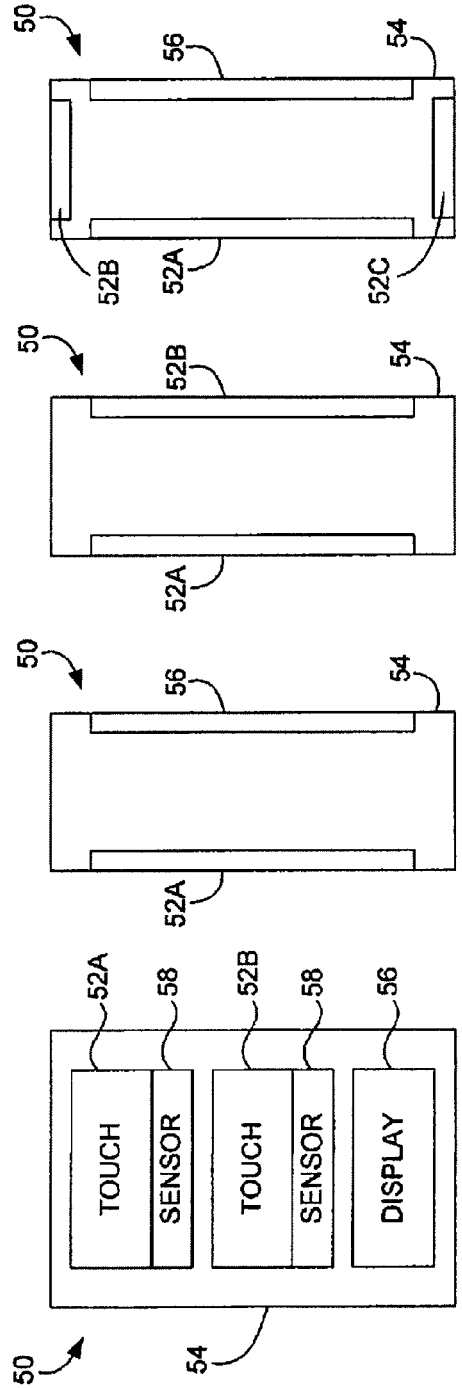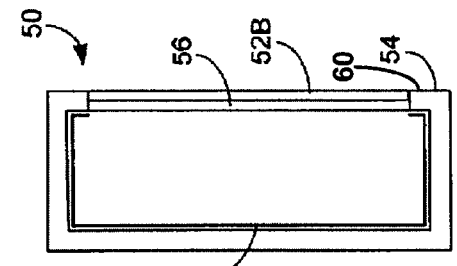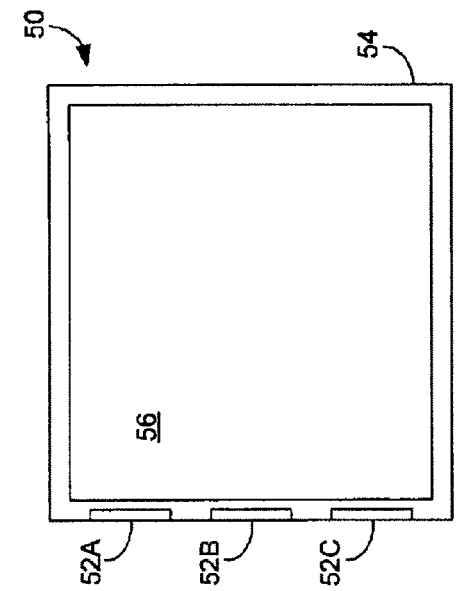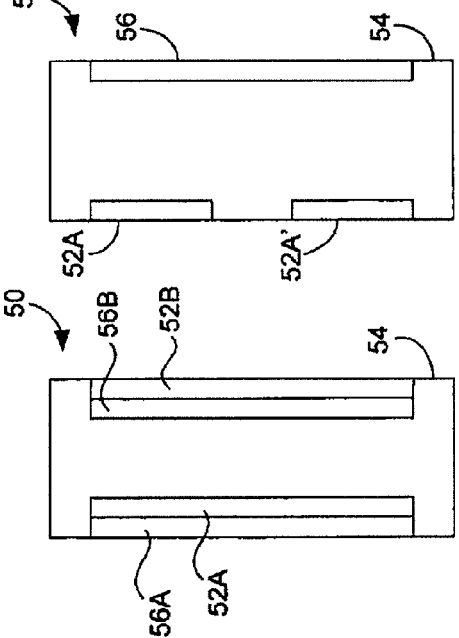

HAND HELD ELECTRONIC DEVICE WITH MULTIPLE TOUCH SENSING DEVICES

CROSS REFERENCE TO RELATED APPLICATIONS

This application claims priority to U.S. Provisional Patent Application No. 60/658,777, titled "MULTI-FUNCTIONAL HAND-HELD DEVICE" filed Mar. 4, 2005, which is herein incorporated by reference.

This application is related to the following applications, which are all herein incorporated by reference:

U.S. patent application Ser. No. 10/188,182, titled, "TOUCH PAD FOR HANDHELD DEVICE" filed on Jul. 1, 2002, and which is herein incorporated by reference.

U.S. patent application Ser. No. 10/722,948, titled, "TOUCH PAD FOR HANDHELD DEVICE" filed on Nov. 25, 2003, and which is herein incorporated by reference.

U.S. patent application Ser. No. 10/643,256, titled, "MOVABLE TOUCH PAD WITH ADDED FUNCTIONALITY" filed on Aug. 18, 2003, and which is herein incorporated by reference.

U.S. patent application Ser. No. 10/654,108, titled, "AMBIDEXTROUS MOUSE" filed on Sep. 2, 2003, and which is herein incorporated by reference.

U.S. patent application Ser. No. 10/840,862, titled, "MULTIPOINT TOUCHSCREEN" filed on May 6, 2004, and which is herein incorporated by reference.

U.S. patent application Ser. No. 10/903,964, titled, "GESTURES FOR TOUCH SENSITIVE INPUT DEVICES" filed on Jul. 30, 2004, and which is herein incorporated by reference.

U.S. patent application Ser. No. 11/038,590, titled, "MODE-BASED GRAPHICAL USER INTERFACES FOR TOUCH SENSITIVE INPUT DEVICES" filed on Jan. 18, 2005, and which is herein incorporated by reference.

U.S. patent application Ser. No. 10/075,964, titled, "ACTIVE ENCLOSURE FOR COMPUTING DEVICE" filed on Feb. 13, 2002, and which is herein incorporated by reference.

U.S. patent application Ser. No. 10/075,520, titled, "COMPUTING DEVICE WITH DYNAMIC ORNAMENTAL APPEARANCE" filed on Feb. 13, 2002, and which is herein incorporated by reference.

U.S. patent application Ser. No. 10/773,897, titled, "ACTIVE ENCLOSURE FOR COMPUTING DEVICE" filed on Feb. 6, 2004, and which is herein incorporated by reference.

BACKGROUND OF THE INVENTION

1. Field of the Invention

The present invention relates generally to hand held electronic device. More particularly, the present invention relates to hand held electronic devices with touch sensing components.

2. Description of the Related Art

There exist today many types of consumer electronic devices, each of which utilizes some sort of user interface. The user interface typically includes an output device in the form of a fixed display such as an LCD and one or more input devices, which can be mechanically actuated as for example, switches, buttons, keys, dials, joysticks, navigation pads, or electrically activated as for example touch pads and touch screens. The display is typically configured to present visual information such as text and graphics, and the input devices are typically configured perform operations such as issuing commands, making selections or moving a cursor or selector in the consumer electronic device. Each of these well known devices has considerations such as size and shape limitations, costs, functionality, complexity, etc. that must be taken into account when designing the consumer electronic device. In most cases, the user interface is positioned on the front face of the electronic device for easy viewing of the display and easy manipulation of the input devices.

FIGS. 1A-1F are diagrams of various handheld electronic devices including for example a telephone 10A (FIG. 1A), a PDA 10B (FIG. 1B), a media player 10C (FIG. 1C), a remote control 10D (FIG. 1D), a camera 10E (FIG. 1E), and a GPS module 10F (FIG. 1F). In each of these devices 10, a display 12, which is secured inside the housing of the device 10, and which can be seen through an opening in the housing, is typically positioned in a first region of the electronic device 10 and one or more input devices 14 are typically positioned in a second region of the electronic device 10 next to the display 12 (excluding touch screens, which are positioned over the display).

To elaborate, the telephone 10A typically includes a display 12 such as a character or graphical display, and input devices 14 such as a number pad and in some cases a navigation pad. The PDA 10B typically includes a display 12 such as a graphical display, and input devices 14 such as a touch screen and buttons. The media player 10C typically includes a display 12 such as a character or graphic display and input devices 14 such as buttons or wheels. The iPod manufactured by Apple Computer, Inc. of Cupertino, Calif. is one example of a media player that includes both a display and input devices disposed next to the display. The remote control 10D typically includes an input device 14 such as a keypad and may or may not have a character display 12. The camera 10E typically includes a display 12 such as a graphic display and input devices 14 such as buttons. The GPS module 10F typically includes a display 12 such as graphic display and input devices 14 such as buttons, and in some cases a navigation pad.

Although the I/O arrangements described above work particularly well, improved I/O arrangements and layouts are needed to improved the functionality of the device in which they are used.

SUMMARY OF THE INVENTION

The invention relates, in one embodiment, to a handheld electronic device. The handheld electronic device includes a first touch sensing device located in a first region of the hand held electronic device. The handheld electronic device includes a second touch sensing device located in a second region of the hand held electronic device. The second region is at a different location than the first region of the hand held electronic device.

The invention relates, in another embodiment, to a hand held electronic device. The handheld electronic device includes a housing. The handheld electronic device includes a display located on a first side of the housing. The hand held electronic device includes a touch sensing device located on a second side of the housing. The second side is opposite the first side.

The invention relates, in another embodiment, to a hand held electronic device. The hand held electronic device includes touch sensing devices located on different sides of the device. The touch sensing devices are configured for mode and feature selection input.

The invention relates, in another embodiment, to a handheld electronic device. The hand held electronic device includes a housing. The hand held electronic device also includes a sensor arrangement disposed underneath an outer surface of the housing, the sensor arrangement being configured to detect the presence of an object on at least a portion of the housing.

The invention relates, in another embodiment, to a method for operating a handheld device. The method includes determining if a user is touching the handheld device. The method also includes determining the user based on the user's touch. The method further includes configuring the handheld device based on the user.

The invention relates, in another embodiment, to a user determination method for a handheld device. The method includes providing baseline hand signals. The method also includes generating a current hand signal when a user grabs the handheld device. The method further includes comparing the current hand signal to at least one baseline hand signal. The method additionally includes determining a characteristic of the user based on the current and baseline hand signals.

BRIEF DESCRIPTION OF THE DRAWINGS

The invention may best be understood by reference to the following description taken in conjunction with the accompanying drawings in which:

FIGS. 1A-1F are diagrams of various electronic devices.

FIG. 2 is a simplified diagram of a portable electronic device, in accordance with one embodiment of the present invention.

FIG. 3 is a simplified side elevation view of a portable electronic device, in accordance with one embodiment of the present invention.

FIG. 4 is a simplified side elevation view of a portable electronic device, in accordance with one embodiment of the present invention.

FIG. 5 is a simplified side elevation view of a portable electronic device, in accordance with one embodiment of the present invention.

FIG. 6 is a simplified side elevation view of a portable electronic device, in accordance with one embodiment of the present invention.

FIG. 7 is a simplified side elevation view of a portable electronic device, in accordance with one embodiment of the present invention.

FIG. 8 is a simplified front view of a portable electronic device, in accordance with one embodiment of the present invention.

FIG. 9 is a simplified side elevation view of a portable electronic device, in accordance with one embodiment of the present invention.

DETAILED DESCRIPTION OF THE INVENTION

Figure 10:
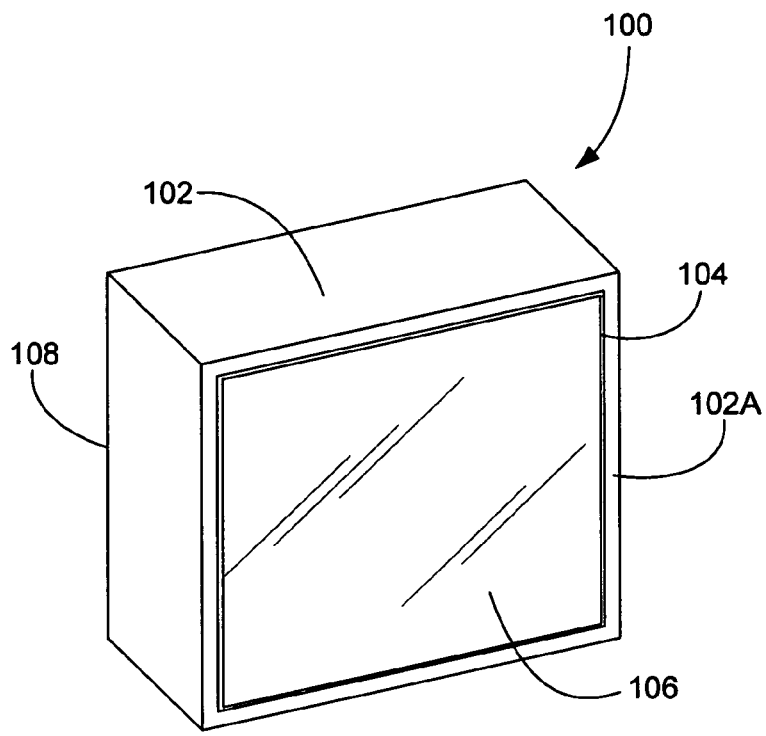
FIG. 10 is a perspective diagram of a hand held electronic device, in accordance with one embodiment of the present invention.

The present invention relates generally to hand held electronic devices and more particularly, the present invention relates to hand held electronic devices with touch sensing components. One aspect of the invention pertains to hand held electronic devices with multiple touch sensing devices. The touch sensing devices may be selected from touch panels, touch screens or touch sensitive housings. By providing multiple touch sensing devices, it is believed that the number of mechanical or physical buttons or switches at the surface of the housing may be limited and that the size of the display may be maximized. In so doing, the functionality and appearance of the device is greatly improved. Another aspect of the invention pertains to the placement of the touch sensing components. The touch sensing components can be placed on the sides, top, bottom, front and back surfaces of the device. In one example, the touch sensing device is placed on the back of the device opposite the display. In cases such as these, the touch plane may be mapped to the display such that there is a one to one relationship therebetween.

Embodiments of the invention are discussed below with reference to FIGS. 2-24. However, those skilled in the art will readily appreciate that the detailed description given herein with respect to these figures is for explanatory purposes as the invention extends beyond these limited embodiments.

FIG. 2 is a simplified diagram of a portable electronic device 50, in accordance with one embodiment of the present invention. The portable electronic device 50 may for example be a hand held electronic device. As used herein, the term "hand held" means that the electronic device is typically operated while being held in a hand. The hand held electronic device may be directed at one-handed operation or two-handed operation. In one-handed operation, a single hand is used to both support the device as well as to perform operations with the user interface during use. Cellular phones, PDAs, media players, and GPS units are examples of portable devices that can be operated solely with one hand. In the case of a cell phone, for example, a user may grasp the phone in one hand between the fingers and the palm and use the thumb to make entries using keys, buttons or a navigation pad. In two-handed operation, one hand is used to support the device while the other hand performs operations with a user interface during use or alternatively both hands support the device as well as perform operations during use. Tablet PCs and game players are examples of portable device that are typically operated with two hands. In the case of the tablet PC, for example, the user may grasp the tablet with one hand and make entries in the tablet using the other hand, or alternatively grasp the tablet in both hands and make entries using either or both hands while holding the tablet PC.

The portable electronic device 50 is configured with one or more touch sensing devices 52 for providing inputs to the portable electronic device 50. In the illustrated embodiment, the portable electronic device 50 includes at least a first touch sensing device 52A that is located in a first region of the portable electronic device, and may include a second touch sensing device 52B that is located in a second region of the portable electronic device 50. The first and second touch sensing devices 52A and 52B, which can be located on the same side (in different regions) or a different side of the portable electronic device 50, can be positioned on any side of the portable electronic device 50 including for example the front, back, top, bottom, right side and/or left side. Furthermore, they can be configured to take up any amount of real estate including large (e.g., an entire side or sides) or small (e.g., a portion of a side).

In one particular embodiment, the first and second touch sensing devices 52A and 52B are located on opposite sides of the portable electronic device, and more particularly on the front and back of the portable electronic device 50. This particular set up allows for one handed operation, i.e., the users thumb can be used to actuate the front side touch sensing device 52B and one of the fingers can be used to actuate the back side touch sensing device 52A. In some cases, the touch sensing devices 52 substantially cover the entire front and back surfaces. In other cases, the touch sensing devices 52 only cover a portion of the front and back surfaces.

The touch sensing devices 52 may be widely varied. The touch sensing devices 52 may correspond to any commercially known touch panel such as touch pads and touch screens (among others). Touch pads are typically positioned within a housing 54 of the portable electronic device 50. The touch pads may for example be accessed through an opening in the housing 54. Touch screens, on the other hand, are transparent input devices that are positioned over a display 56 of the portable electronic device 50. By way of example, touch pads and touch screens that may be used are disclosed in U.S. patent application Ser. Nos. 10/188,182, 10/722,948, 10/643,256, 10/840,862, all of which are herein incorporated by reference.

In each of these examples (e.g., touch pads and touch screens), the touch sensing device 52 consists of a sensor arrangement 58. The sensor arrangement 58 is configured to detect the presence of an object such as a finger as well as the location and pressure being exerted on the surface of the panel by the finger or palm of the hand. By way of example, the sensor arrangement 58 may be based on capacitive sensing, resistive sensing, surface acoustic wave sensing, and/or the like. The sensor arrangement 58 may further be based on pressure sensing such as strain gauges, force sensitive resisters, load cells, pressure plates, piezoelectric transducers or the like.

Alternatively, one or more of the touch sensing devices 52 may be integrated directly into the housing 54 of the portable electronic device 50 thereby forming a touch sensitive housing. In cases such as this, the sensor arrangement 58 is either integral with the housing 54 or positioned behind the housing 54 (rather than being part of a separate device such as a touch pad that is positioned inside the housing). The touch sensitive housing can be configured to cover the entire housing 54, or alternatively only a portion of the housing 54, as for example, one or more sides of the housing 54, portions of one or more sides of the housing 54, and the like. In some cases, the sensor arrangement 58 may only be located in specific area of the housing 54 in order to form distinct buttons on the surface of the portable electronic device 50.

The configuration of the portable electronic device 50 and its various components can be widely varied. Several configurations are shown in FIGS. 3-9. It should be noted, however, that these configurations are by way of example and not by way of limitation.

As shown in FIG. 3, the portable electronic device 50 includes a housing 54 and a display 56 situated in a front surface of the housing 54. The portable electronic device 50 also includes a touch sensing device 52A in the form of a touch panel such as a touch pad that is situated on the back surface of the housing 14 opposite the display 56. In some cases, the touch sensing device 52A is sized and dimensioned similarly to the display 56. Furthermore, the touch sensing device 52A may be positioned so that the center point of the touch sensing device 52A coincides with the center point of the display 56. The touch sensing device 52A and display 56 therefore have a one to one relationship. In fact, the touch sensing nodes of the touch sensing device 52A may be mapped to the plane of the display 56 so that inputs on the touch sensing device 52A correspond to similar points on the display 56 (similar to a touch screen). In some cases, the portable electronic device 50 further includes a second touch sensing device 52B in the form of a touch screen that is positioned over the display 56. The second touch sensing device 52B is therefore positioned opposite the first touching sensing device 52A.

As shown in FIG. 4, the portable electronic device 50 includes a housing 54 with first and second touch sensing devices 52A and 52B. The touch sensing devices may for example be touch panels such as touch pads that are positioned in the housing 54. The first touch sensing device 52A is located on the back surface of the housing 54 and the second touch sensing device 52B is located on the front surface of the housing 54. Alternatively, the touch sensing devices 52 may be associated with a touch sensitive housing. In either case, the portable electronic device 50 may or may not include a display (e.g., some portable devices do not require a display as for example the iPod Shuffle™ manufactured by Apple Computer, Inc., of Cupertino, Calif.).

As shown in FIG. 5, the portable electronic device 50 includes a housing 54 with a display 56 and a plurality of touch sensing devices 52. A first touch sensing device 52A is located on the back surface of the housing 54 and a second touch sensing device 52B is located on a first side of the housing 54. In some cases, a third touch sensing device 52C is located on a second side of the housing 54. And in other cases, although not shown, fourth and fifth sensing devices may be located at the other sides of the housing 54. The touch sensing devices 52 are shown as touch panels, but it should be noted that this embodiment may also be implemented with a touch sensitive housing.

As shown in FIG. 6, the portable electronic device 50 includes a housing 54 with a first display 56A situated in a back surface of the housing 54 and a second display 56B situated in a front surface of the housing 54. The portable electronic device 50 also includes a first touch sensing device 52A in the form of a first touch screen positioned in front of the first display 56A and a second touch sensing device 52B in the form of a second touch screen in front of the second display 56B.

As shown in FIG. 7, the portable electronic device 50 includes a housing 54 and a display 56 situated in a front surface of the housing 54. The portable electronic device 50 also includes a plurality of touch sensing devices 52 located at one side of the housing 54. In the illustrated embodiment, the portable electronic device 50 includes first and second touch sensing devices 52A and 52A' that are positioned on the back surface of the housing 54. Although on the same side, the touch sensing devices 52A and 52A' are separate and spatially distinct input devices. This particular implementation may be well suited for portable electronic devices such as tablet PCs and game players that are operated with two hands. The touch sensing devices 52A and 52A' may be placed at locations on the back surface so that one touch sensing device is actuated by a left hand and the other touch sensing device is actuated by a right hand while the portable electronic device is held by both hands. By way of example, the first touch sensing device 52A may be placed on the left back surface so that the fingers of the left hand can actuate the first touch sensing device 52A, and the second touch sensing device 52A' may be placed on the right back surface so that the fingers of the right hand can actuate the second touch sensing device 52A'.

As shown in FIG. 8, the portable electronic device 50 includes a housing 54 and a display 56 situated in a front surface of the housing 54. The portable electronic device 50 also includes a plurality of distinct touch sensing devices 52 located at one side of the housing 54. In the illustrated embodiment, the portable electronic device 50 includes first, second and third touch sensing devices 52A, 52B and 52C that are positioned on the same side surface of the housing 54 (e.g., left or right side). Although on the same side, the touch sensing devices 52A-52C are separate and spatially distinct input devices. This particular implementation may be well suited for portable electronic devices such as cellular phones, PDAs and media players that are operated with one hand. The touch sensing devices 52A-52C may be placed at locations on the side surface so that one touch sensing device 52A is actuated by an index finger, another touch sensing device 52B is actuated by a middle finger and yet another touch sensing device is actuated by the ring finger while the device is held in a single hand.

As shown in FIG. 9, the portable electronic device 50 includes a touch sensitive housing 54 and a display 56 situated in a front surface of the touch sensitive housing 54. The touch sensitive housing 54 includes sensing components 58 that are positioned on the interior surface of the housing 54. Alternatively, they can be placed within the walls of the housing 54. The sensing components 58 are placed at least on one side of the housing 54, and may be placed on all sides of the housing 54. In the illustrated embodiment, the sensing components 58 cover the entire interior surface of the housing 54 including a bezel 60 of the housing 54. In some cases, the portable electronic device 50 additionally includes a touch sensing device 52 in the form of a touch screen positioned in front of the display 56. In cases such as this, the entire outer surface of the portable electronic device 50 is considered touch sensitive, i.e., the entire surface of the housing 54 and the entire surface of the display 56.

It should be noted that in embodiments associated with being hand held, the portable electronic device described above may correspond to any consumer related electronic product configured for handheld use. By way of example, the portable electronic device may correspond to tablet PCs, PDAs, media players (music, images, video), game players, telephones, cellular phones, mobile radios, cameras, GPS modules, remote controls, and/or the like.

It should also be pointed out that while laptops, tablet PCs, and PDAs (to name a few), are all portable electronic devices, only a few of them can truly be considered hand held devices. Hand held implies that the devices are manipulated while being held in the hand. That is, they are used primarily in the users hand during use (no reference surface is needed). This typically eliminates laptops from having the hand held designation. As should be appreciated, input devices on laptops (e.g., touch pads, buttons and keyboards) are typically not manipulated while the laptop is held in the hand, but rather while the laptop is supported on the lap or on a surface such as a desktop. This allows a user for example to use both hands when keyboarding.

FIG. 10 is a perspective diagram of a hand held electronic device 100, in accordance with one embodiment of the present invention. The hand held electronic device 100 includes a housing 102 that encloses internally various electrical components including integrated circuit chips and other circuitry to provide computing operations for the hand held electronic device 100. By way of example, the housing 102 may contain a microprocessor (e.g., CPU), memory (ROM, RAM), a power supply (e.g., battery), a printed circuit board (PCB), a hard drive or other memory (e.g., flash) and/or various input/output (I/O) support circuitry. In addition, the housing 102 may also define the shape or form of the hand held electronic device 100. That is, the contour of the housing 102 may embody the outward physical appearance of the hand held electronic device 100. The size and shape of the housing 102 may be widely varied, but is typically configured for hand held use.

The hand held electronic device 100 also includes a display 104 disposed within and viewable through an opening in the housing 102. The display 104, which is typically placed on the front surface of the device 100, can be configured to fill only a portion of the front surface of the housing 102, or alternatively can be configured to fill the entire front surface of the housing 102 (which will be discussed below). The display 104 provides visual information in the form of text, characters or graphics. The display 104 is typically selected from flat panel devices although this is not a requirement and other types of displays may be utilized. Flat panel devices typically provide a planar platform that is ideal for hand held devices. By way of example, the display 104 may correspond to a liquid crystal display (LCD) such as a character LCD that is capable of presenting text and symbols or a graphical LCD that is capable of presenting images, video, and graphical user interfaces (GUI). Alternatively, the display 104 may correspond to a display based on organic light emitting diodes (OLED), or a display that is based on electronic inks.

In one embodiment, the display 104 is configured to substantially fill the front surface of the housing 102. By way of example, the display 104 may extend from one edge of the housing 102 to the opposite edge of the housing 102 or in some cases the housing 102 may include a small bezel 102A that surrounds the edges of the display 104 at the front surface of the housing 102 (as shown). In either case, the display 104 makes up a substantial portion of the front surface of the hand held electronic device 100 thereby eliminating any real estate for placing buttons or switches associated with a conventional user interface. In essence, the size of the display 104 is maximized to the size of the hand held electronic device 100 or alternatively, the hand held electronic device 100 is minimized to the size of the display 104. Either way, the display 104 is allowed to utilize a greater amount of the real estate of the hand held electronic device 100 than would otherwise be allowed in conventional hand held electronic devices that are limited by buttons and switches located with the display on the front surface.

In order to generate user inputs, the hand held electronic device 100 may include a touch screen 106 that is a transparent input panel positioned in front of the display 104. The touch screen 106 generates input signals when an object such as a finger (or stylus) is moved across the surface of the touch screen 106 (e.g., linearly, radially, rotary, etc.), from an object holding a particular position on the touch screen 106 and/or by a finger tapping on the touch screen 106. In most cases, touch screens allow a user to make selections and initiate movements in a GUI by simply touching the display screen via a finger. For example, a user may make a selection by pointing directly to a graphical object displayed on the display screen. The graphical object may for example correspond to an on-screen button for performing specific actions in the hand held electronic device 100. In general, the touch screen 106 recognizes the touch and position of the touch on the display 104 and a controller of the hand held electronic device 100 interprets the touch and thereafter performs an action based on the touch event. There are several types of touch screen technologies including resistive, capacitive, infrared and surface acoustic wave.

In accordance with one embodiment, the touchscreen is a multitouch sensing device that has the ability to sense multiple points of contact (or near contact) at the same time and report the multiple touches to the controller of the handheld electronic device. That is, the touchscreen is capable of simultaneously sensing multiple touch inputs. This type of sensing device is sometimes referred to as a multipoint touch sensing device (e.g., multipoint touchscreen).

In one implementation, the touch screen 106 is a multipoint capacitive touch screen that is divided into several independent and spatially distinct sensing points, nodes or regions that are positioned throughout the touch screen. The sensing points, which are typically hidden from view (transparent), are dispersed about the touch screen with each sensing point representing a different position on the surface of the touch screen (or touch screen plane). The sensing points may be positioned in a grid or a pixel array where each pixilated sensing point is capable of generating a signal. In the simplest case, a signal is produced each time an object is positioned over a sensing point. When an object is placed over multiple sensing points or when the object is moved between or over multiple sensing point, multiple signals can be generated. The sensing points generally map the touch screen plane into a coordinate system such as a Cartesian coordinate system a Polar coordinate system or some other coordinate system. An example of a multipoint capacitive touch screen may be found in U.S. patent Ser. No. 10/840,862, which is herein incorporated by reference.

In accordance with another embodiment, the housing 102 may include a touch sensitive surface 108 that provides either a larger surface for tracking touch inputs or smaller dedicated areas such as touch buttons for performing dedicated functions. The touch sensitive surface 108 can be located on any surface of the housing 102, any side of the housing 102, any portion of any side of the housing 102 or at dedicated locations on the surface of the housing 104. By way of example, the touch regions may be located on the sides or back surface of the housing 102, and may even be located at the bezel 102A located at the front surface of the housing 102. In all of these cases, a large portion of the front surface of the housing 102 is saved for the display 104 so that the viewing area of the hand held electronic device 100 can be maximized. Furthermore, placing touch sensing regions at these locations tend to encourage one handed use. For example, the touch sensing regions can be placed at locations where the finger of the hand are normally positioned when holding the hand held electronic device 100. The fingers can therefore be used to initiate inputs as well as hold the hand held electronic device 100 during use. Moreover, the hand does not have to be constantly repositioned in order to actuate different input devices since they are located in the area of the various digits of the hand.

The touch sensitive surface 108 may take the form of one or more touch panels that are positioned within the housing 104. For example, a touch pad or touch screen like device (with or without a display) may be used. The touch sensitive surface 108 may be alternatively or additionally be provided directly by the housing 104. That is, the touch sensing components are integrated or incorporated into or disposed underneath the housing 104 such that the housing 104 itself is the touch sensing device (rather than using a separate touch panel). This particular implementation is believed to be more aesthetically pleasing than using touch panels in that the housing 104 can have a uniform appearance with no lines, breaks or openings in the surface. That is, the surface of the housing 104 is continuous smooth surface that can be made to look like it does not have any input devices, just a display and a housing (e.g., a device with no visible input devices).

In accordance with one embodiment, the touch sensitive surface is a multitouch sensing device that has the ability to sense multiple points of contact (or near contact) at the same time and report the multiple touches to the controller of the handheld electronic device. That is, the touch sensitive surface is capable of simultaneously sensing multiple touch inputs. This type of sensing device is sometimes referred to as a multipoint touch sensing device.

Similar to the touch screen, the touch sensitive surface (whether from a touch pad, touch housing or touch screen) may be a multipoint capacitive touch device that is divided into several independent and spatially distinct sensing points, nodes or regions that are positioned throughout the device. The sensing points, which are typically hidden from view (transparent), are dispersed about the device with each sensing point representing a different position on the touch sensitive surface. The sensing points may be positioned in a grid or a pixel array where each pixilated sensing point is capable of generating a signal. In the simplest case, a signal is produced each time an object is positioned over a sensing point. When an object is placed over multiple sensing points or when the object is moved between or over multiple sensing point, multiple signals can be generated. Like the touch screen, the sensing points generally map the touch screen plane into a coordinate system such as a Cartesian coordinate system a Polar coordinate system or some other coordinate system. As mentioned above, multipoint capacitive touch sensing devices are disclosed in U.S. patent Ser. No. 10/840, 862.

In one particular embodiment, the only way to generate user inputs in the hand held electronic device 100 is through the touch screen 106 and/or the touch sensitive surface 108 of the housing 102. The touch screen 106 and touch sensitive surface 108 completely replace all other input means of the hand held electronic device 100. No other input devices such as mechanical buttons and switches are included thus saving the real estate for the display 104. In some cases, however, it may be desirable to include a hold switch that locks and unlocks the one or more touch sensing device from receiving inputs (e.g., the hold switch prevents inputs when not desired). In cases such as these, the hold switch is not located on the front surface with the display thereby enabling the display to fill the front surface. Rather, the hold switch is located on one of the side surfaces such as the top surface of the device.

It should be noted however that this is not a limitation and that the device may include a limited number of physical buttons and switches. It is generally desirable to keep the number limited on the front surface so that the available space of the device can be saved for the display.

The hand held electronic device 100 may be designed to recognize gestures applied to the touch screen 106 and/or touch sensitive surface 108 of the housing (track pads) and to control aspects of the hand held electronic device 100 based on the gestures. Gestures may be defined as a stylized interaction with an input device that is mapped to one or more specific computing operations. The gestures may be made through various hand, and more particularly finger motions. Alternatively or additionally, the gestures may be made with a stylus. In all of these cases, the input devices (touch screen and touch sensitive surface) receive the gestures and the controller of the hand held electronic device 100 executes instructions to carry out operations associated with the gestures. The gestures may be single point or multipoint gestures. The hand held electronic device 100 may include a gesture operational program, which may be part of the operating system or a separate application. The gestural operation program generally includes a set of instructions that recognizes the occurrence of gestures and informs one or more software agents of the gestures and/or what action(s) to take in response to the gestures. By way of example, gestures that can be used are disclosed in greater detail in U.S. patent Ser. No. 10/903,964, which is herein incorporated by reference. Other touch related techniques may also be found in U.S. patent Ser. No. 11/038,590, which is herein incorporated by reference.

Alternatively or additionally, the hand held electronic device may be designed to recognize hand images and to control aspects of the hand held electronic device based on the hand images. Each hand image represents a profile of the fingers or other portions of the hand in contact with the touch sensitive surface as well as the touch screen at a particular instant in time, i.e., the hand image describes how the device is held. The hand images (or signals) may be used to initiate certain functions or to make a determination as to what user is using the hand held electronic device. By way of example, the functions may include initiating commands, selecting an item, opening a file or document, launching a program, executing instructions, viewing a menu on the display screen, and/or the like. With regards to the determination, the hand signal may be used to determine the identity of the user (e.g., Bob or Carol) or to a type of user (e.g., left or right handed user). The hand held device may contain a list of hand profiles with actions associated therewith. The hand profiles generally describe how the device is held while the actions describe what type of action to perform based on the hand profile.

In addition, the hand image may be used to determine the orientation of the device as for example when the device is held at 0, 90, 180 and 270 degrees. With this information, the device may be configured to always display images in an upright no matter what orientation the device is in.

Figure 11:
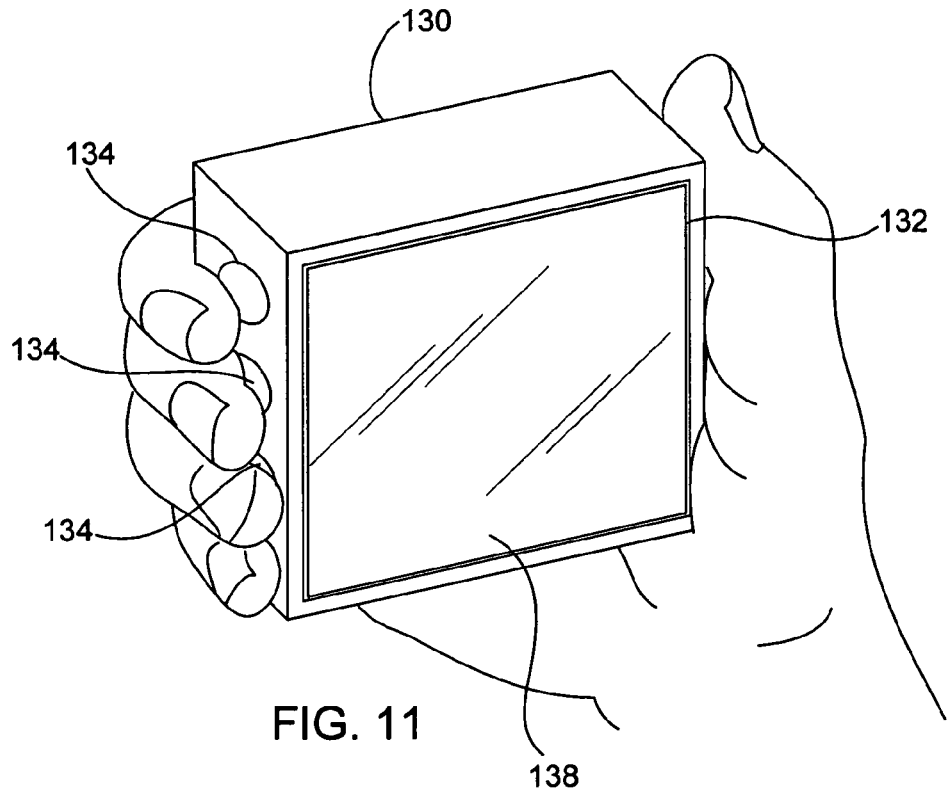
FIG. 11 is a perspective diagram of a one handed hand held electronic device, in accordance with one embodiment of the present invention.

In one embodiment, the hand held electronic device 100 is a "one-handed" hand held electronic device. The housing 102 is therefore sized and dimension to fit into a single hand, and the touch sensitive surface 108 is configured to receive inputs from the various fingers of the single hand. As shown in FIG. 11, the "one-handed" hand held electronic device 100 is sized and shaped for comfortable placement into the user's hand 116. The single hand 116 essentially cups the device 100, with the thumb 116A and palm 116B being positioned on one side of the device 100, and the fingers 116C being positioned on the opposite side (thereby gripping the device). Although the shape of the device 100 may be widely varied, it should be pointed out that the general size including height, width and thickness is typically "pocket sized" so that the device 100 can easily be placed in the pocket of the user during transport.

The size of the one handed hand held device may be widely varied. The size may be based on several factors including the largest available display size and the type of display format. By way of example, the one handed hand held device may have a height between about 3.3 and about 4.1 inches, a width between about 0.98 and about 2.4 inches, and a thickness between about 0.33 and about 0.75 inches.

Figure 12:
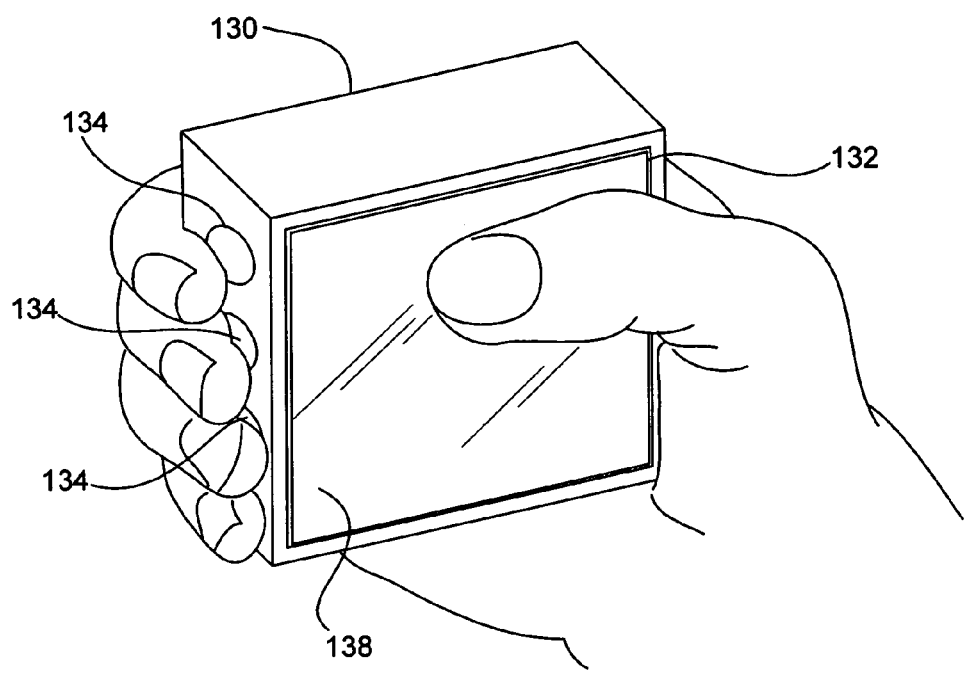
FIG. 12 is a perspective diagram of a one handed hand held electronic device, in accordance with one embodiment of the present invention.
Figure 13:
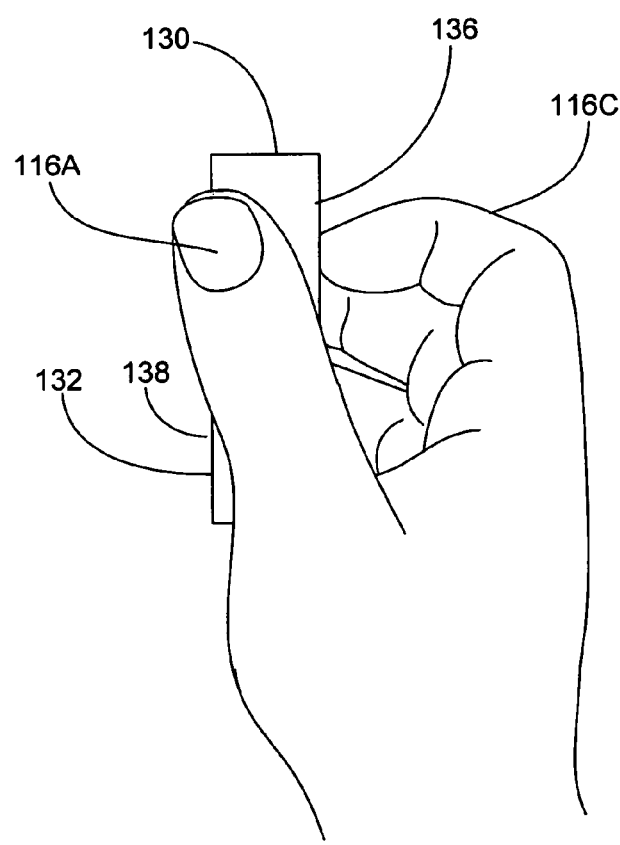
FIG. 13 is a side view diagram of a one handed hand held electronic device, in accordance with one embodiment of the present invention.

Referring to FIGS. 11-13, one example of a "one-handed" hand held electronic device will be described in greater detail. As shown in FIG. 11, the "one-handed" hand held electronic device 130 includes a full screen display 132 located in the front of the device 130. The "one-handed" hand held electronic device 130 is also configured with one or more touch buttons 134 located on one or more sides of the device 130. The touch buttons 134 may be located in the vicinity of where the various fingers are placed to hold the device 130 (e.g., left and right sides). The user simply has to press harder or tap in the area of the touch button 134 in order to actuate the touch button 134. In the case of a media player such as a music player, the touch buttons 134 may represent button functions such as next, previous, volume up, volume down and/or play/pause.

The "one-handed" hand held electronic device 130 is also configured with a touch surface 136 on the back surface of the hand held electronic device 130. The touch surface 136 is located directly behind the display 132. The touch surface may be provided by a touch panel and/or a touch sensitive housing. As shown in FIG. 12, the user simply moves their finger from the side position to the back position in order use the touch surface 136. The finger may be tapped, pressed, or slid across the touch surface 136 in order to generate tracking inputs. In some cases, gestures may be performed.

In one embodiment, the touch surface is mapped to the display. When mapped, points on the touch surface coincide with points on the display, i.e., have the same coordinates (x and y). Therefore, when a user touches the touch surface, it will appear as if the user is touching the image at the same location but on the other side of the touch.

The "one-handed" hand held electronic device 130 also includes a touch screen 138 disposed over the display 132. The touch screen 138 provides another way to input into the hand held electronic device 130. As shown in FIG. 13, the user simply moves their thumb from the side position to the front position in order to use the touch screen 138. The thumb may be tapped, pressed, or slid across the display 132 in order to generate inputs. In some cases, gestures may be performed.

In one embodiment, the device 130 is an ambidextrous device that can be used equally by both left and right hands. In cases such as this, the device 130 is configured to have the same feel and function for both the left and right hands. For example, the device 130 may include the same touch regions for both hands of the user. Alternatively, the device may include a touch surface on only one side, which can be utilized by both hands when the device is flipped 180 degrees. In cases such as this, the display is configured to rotate the displayed image so that the image is upright in either orientation.

The device 130 may further include a handedness selection system for configuring the device 130 for right handed or left handed use. In one implementation, the handedness selection system is a user actuated system that allows a user to select which hand configuration is desired (e.g., left or right). For example, the handedness of the device 130 may be selected via software as for example through a control panel located on a graphical user interface.

In another implementation, the handedness selection system is a device actuated system that allows the device 130 to automatically configure the device 130 for right handed or left handed use based on how the user grabs the device 130 (e.g., position and pressure). If a left handed user grabs the device 130, then the device 130 configures itself to be a left handed device during use. If a right handed user grabs the device 130, then the device configures itself to be a right handed device. By way of example, the device 130 may analyze the hand image created by the touch sensing devices and thereafter make a determination as to whether the hand is left or the right hand based on what was detected. For example, if the sensors detect the presence of fingers on the left side then the device 130 may determine that the device 130 is being used by a right handed user, or alternatively if the sensors detect the presence of fingers on the right side then the device 130 may determine that the device 130 is being used by a left handed user. Once the determination is made, the device 130 can turn on the functionality of the touch buttons corresponding to the hand being used and turn off the functionality of the touch buttons corresponding to the hand not in use.

In another embodiment, the hand held electronic device 100 is a "two-handed" hand held electronic device 100. The housing 102 is therefore sized and dimension to fit into two hands, and the touch sensitive surface 108 is configured to receive inputs from the various fingers of the both hands. The two handed hand held electronic device may for example correspond to a tablet PC or game player.

Figure 14:
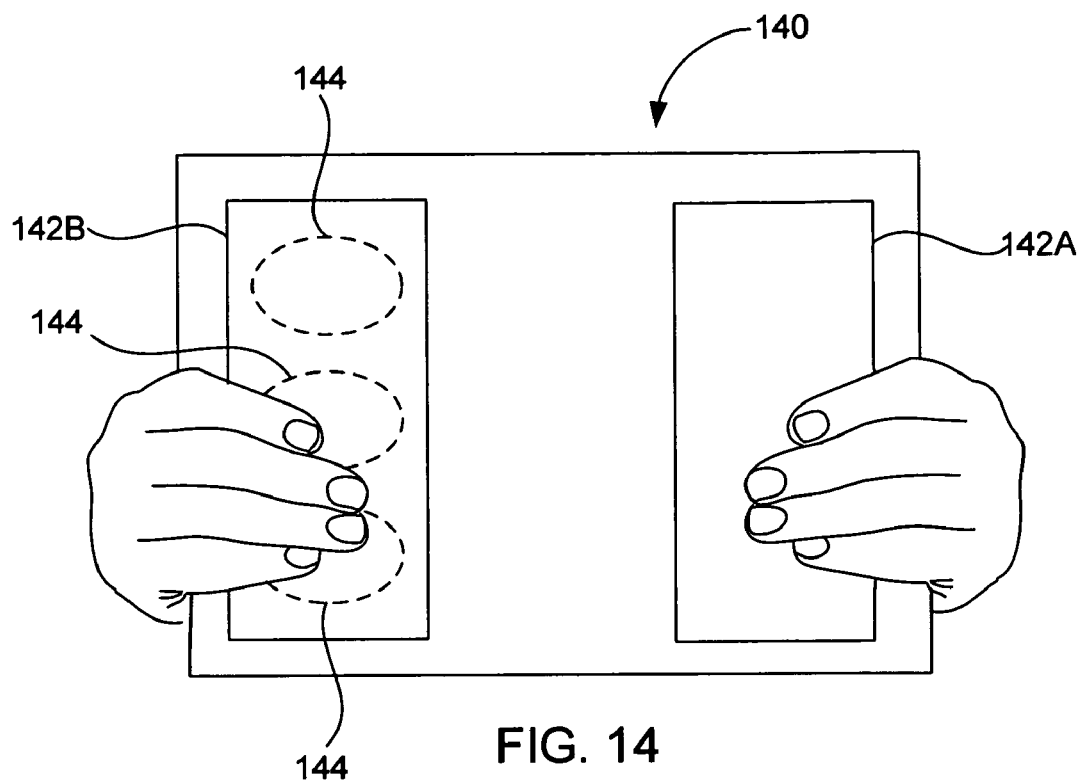
FIG. 14 is a back view diagram of a two handed hand held electronic device, in accordance with one embodiment of the present invention.
Figure 15:
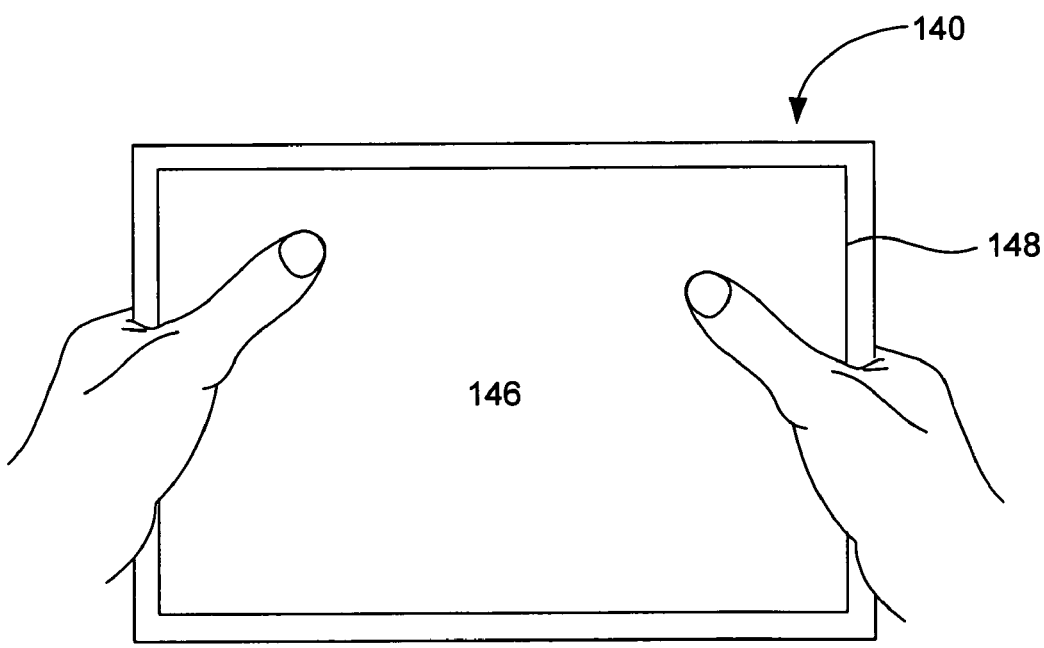
FIG. 15 is a front view diagram of a two handed hand held electronic device, in accordance with one embodiment of the present invention.

As shown in FIGS. 14 and 15, the "two-handed" hand electronic device 100 in the form of a tablet PC is sized and shaped for comfortable placement into both of the user's hands. Each hand essentially cups the sides of the device 100, with one hand gripping the device on one side and the other hand gripping the device on the opposite side. Alternatively, the user is also able to hold the device 100 in one hand while inputting into the device 100 with the opposite hand. Although the shape of the tablet PC may be widely varied, it should be pointed out that the general size including height, width and thickness of a tablet pc is typically "page sized".

The size of the tablet pc may be widely varied. The size may be based on such factors as display size, display format, etc. By way of example, the tablet pc may have a height of about 12 inches, a width of about 8.5 inches and a thickness of about 1 inch (or less).

It should be emphasized that page sized is not as transportable as pocket sized. However, by being page sized the device can include increased functionality that is not capable in smaller devices. Furthermore, page sized devices typically must be used by two hands and therefore they are not as convenient to use when on the go.

As shown in FIG. 14, the "two-handed" hand held electronic device 140 may be configured with two touch regions 142A and 142B on the back surface of the device 100 opposite the display 104. The touch regions 142 are located in the vicinity of where the various fingers are placed to hold the device 140. The first touch region 142A is located on the left back surface in the region where the left hand and more particularly the left fingers are placed to hold the device 140, and the second touch region 142B is located on the right back surface in the region where the right hand and more particularly the right fingers are placed to hold the device 140. Each of the touch regions 142 may be formed by one or more touch sensing devices (or zones if using the touch sensitive housing). For example, the touch regions 142 may include one large touch sensing device (or zones) or several smaller touch sensing devices (or zones). The touch regions may be implemented by touch panels and/or touch sensitive housings.

In the illustrated embodiment, the left touch region 142A is provided by one large touch surface while the right touch region 142B is broken up into smaller touch surfaces such as for example touch buttons 144. Like the "one-handed" device mentioned above, the fingers may be tapped, pressed, or slid across the touch surface in order to generate inputs. In some cases, gestures may be performed. Furthermore, the fingers may select the touch buttons in order to generate button inputs. The "two-handed" hand held electronic device 140 also includes a touch screen 146 disposed over a display 148. The touch screen 146 provides another way to input into the hand held electronic device 140. As shown in FIG. 15, the user simply moves their thumb over the display 148 in order to generate inputs. The thumb may be tapped, pressed, or slid across the touch screen 146 in order to generate inputs. In some cases, gestures may be performed.

Figure 16:
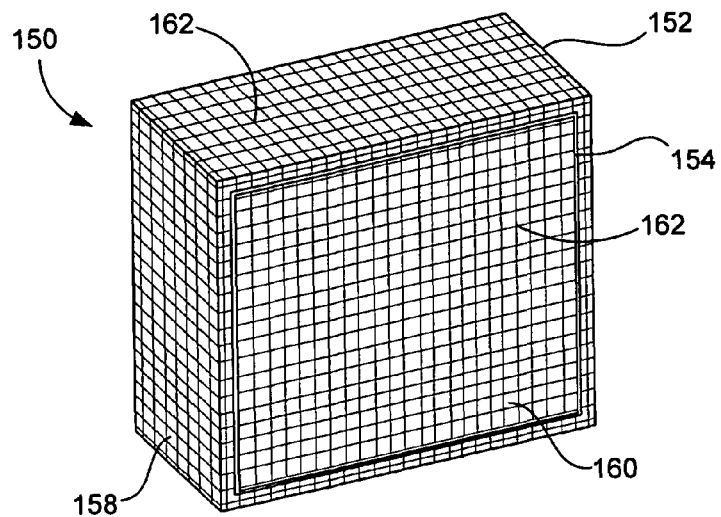
FIG. 16 is a perspective diagram of a hand held electronic device, in accordance with one embodiment of the present invention.
Figure 17A:
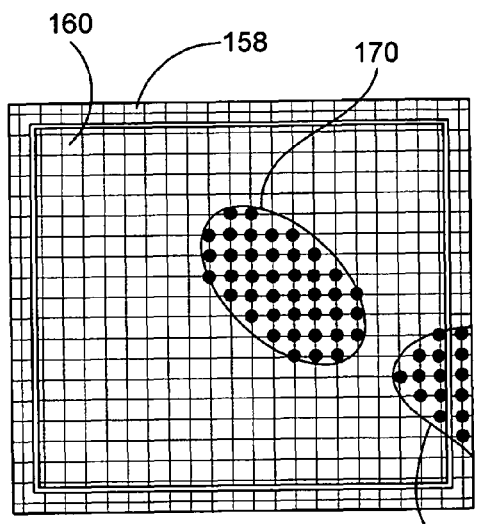
FIGS. 17A-17D are various diagrams of the hand held electronic device shown in FIG. 16 including contact patch areas created by a hand holding the hand held electronic device, in accordance with one embodiment of the present invention.
Figure 17B:
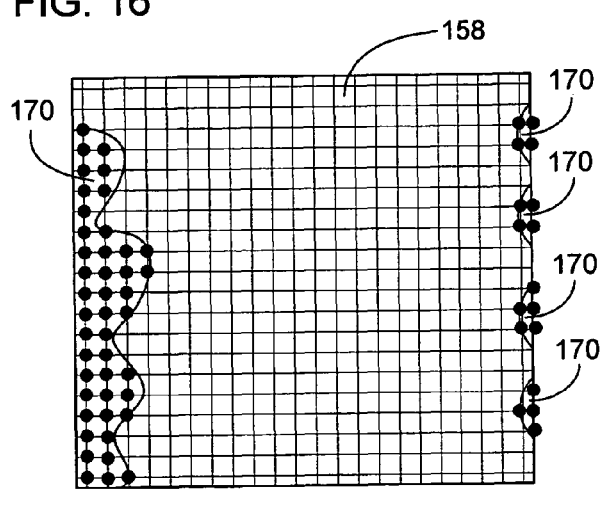
Figure 17C:
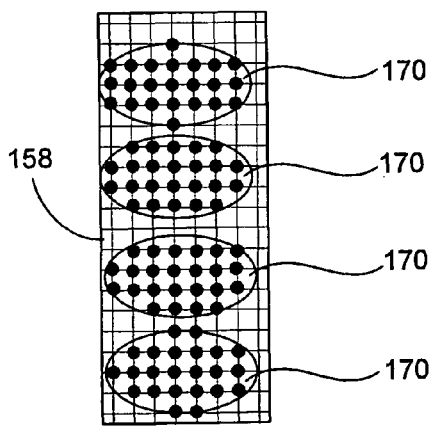
Figure 17D:
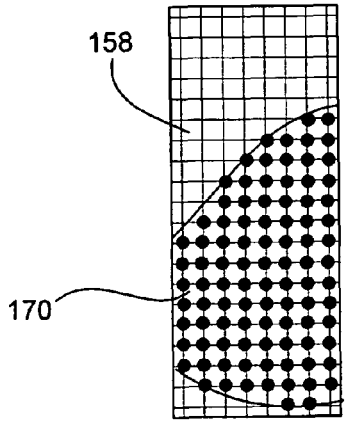

FIG. 16 is a perspective diagram of a hand held electronic device 150, in accordance with one embodiment of the present invention. In this embodiment, the hand held electronic device 150 includes a completely touch sensitive housing 152 and a display 154 with a touch screen 156 that covers the entire display 154. The device 150 is therefore completely touch sensitive. That is, substantially all locations on the surface of the device 150 are capable of sensing surface contact so that the device 150 knows where and when all the fingers and palm are touching the device 150 and how much pressure there is at each point. The same ideas and uses could be applied to any device having a substantial portion of its housing sensitive to touch.

The touch sensitive housing 152 includes a first sensor arrangement 158, and the touch screen 156 includes a second sensor arrangement 160. The first sensor arrangement 158 may be integrally formed into the wall of the housing 152 or they may be located behind the wall within the enclosed space defined by the housing 152 (e.g., adjacent the interior wall). The second sensor arrangement 160 may be integrally formed over the display 154 or it may be a separate unit disposed over the display 154. Both sensor arrangements 158 and 160 are configured to detect the presence of multiple objects such as fingers or the palm of the hand as for example when the hand grasps the housing 152.

As shown, each sensor arrangement 158 and 160 is divided into several independent and spatially distinct sensing points 162 (or regions) that are positioned within the respective component. The sensing points 162 are generally dispersed about the respective component with each sensing point 162 representing a different position on the surface of the component and thus the device 150. The sensing points 162 may be positioned in a grid or a pixel array where each pixilated sensing point 162 is capable of generating a signal. The number and configuration of the sensing points 162 may be widely varied. The number and configuration of sensing points 162 generally depends on the desired resolution of the touch sensitive surface and may be varied from spot to spot across the housing 152 to achieve any desired compromise between cost and functionality.

In the simplest case, a signal is produced each time the finger is positioned over a sensing point 162. When an object is placed over multiple sensing points or when the object is moved between or over multiple sensing points, multiple position signals are generated. In most cases, the signals are monitored by a control system (not shown) that converts the number, combination and frequency of the signals into control information. As should be appreciated, the number, combination and frequency of signals in a given time frame may indicate size, location, direction, speed, acceleration and the pressure of the finger or palm on the surface of the device. By way of example, the control system may be a microcontroller located within the housing 152.

The sensing points 162 may be based on capacitance. As should be appreciated, whenever two electrically conductive objects come near one another without touching, their electric fields interact to form capacitance. By detecting when the capacitance changes (e.g., increase, decreases) the device's electronics can determine when and where the finger and palm of the hand are touching. Any conventional form of capacitance sensing may be used. The simplicity of capacitance allows for a great deal of flexibility in design and construction of the sensor arrangement (e.g., mutual capacitance sensing, self capacitance, etc.).

In the illustrated embodiment, the sensor arrangements 158 and 160 include a two layer grid of spatially separated electrodes or wires and that are connected to the control system of the device 150. The upper layer includes electrodes in rows while the lower layer includes electrodes in columns (e.g., orthogonal). As should be appreciated, when a portion of a hand nears the intersection of two electrodes and, the capacitance at the electrodes and changes since the hand has very different dielectric properties than air. These changes can be used to determine the positions of the finger and/or palm when they grab the device. In some cases, the amount of capacitance at each of the electrodes and can be measured by the control system when a portion of a hand nears the intersection of two electrodes (e.g., sensing point). In other cases, capacitance from each of the row electrodes to each of the column electrodes can be measured by the microcontroller when a portion of a hand nears the intersection of two electrodes (e.g., sensing point).

The signals generated at the sensing points 162 may be used to determine how the user is holding the device. By way of example and referring to FIG. 11 and FIGS. 17A-17D, each portion of the hand in contact with the device 150 produces a contact patch area. Each of the contact patch areas covers several sensing points 162 thus generating several signals. The signals may be grouped together to form a hand signal that represents how the user is holding the device 150. In essence, the hand signal is a pixilated image of the hand in contact with the device 150.

In one embodiment, the difference between a current hand signal and a last hand signal may indicate the user's desire to implement a button function. As should be appreciated, when a user presses on the surface of the device 150 the area of some of the contact patch areas increases thereby activating more sensing points 162 than previously activated. A significant difference indicates the user's desire to implement a button function. Changes between contact patch areas may further indicate the particular button function.

In relative mapping, the difference at each particular contact patch area is compared relative to the other particular contact patch areas. For example, if the contact patch area for the index finger grows more significantly than the contact patch area for the middle or ring fingers between first and second signals then a first button function may be implemented. Furthermore, if the contact patch area for the middle finger grows more significantly than the contact patch area for the index and ring fingers between first and second signals a second button function may be implemented. Moreover, if the contact patch area for the ring finger grows more significantly than the contact patch area for the index and middle fingers between first and second signals a third button function may be implemented.

In absolute mapping, the touch surface is divided into one or more button zones that represent regions of the device that when selected implement the particular button function associated with the button zone. The button zone having the contact patch area with the most significant change between first and second hand signals is the one that is typically implemented. The user may customize the device by setting the configuration of button zones before use. For example, the device may be configured as a one button device, two button device, three button device or the like. The position and size of the button zones may also be customizable. For example, the device may be configured with button zones on only the front or back of the device or on the side of the device. The customization may be performed by the user and/or the device.

In another embodiment, the similarity between a baseline hand signal and a current hand signal may indicate the user's desire to implement a control function (e.g., gesturing). For example, if the baseline hand signal corresponds to a first button function and the current hand signal is similar to the baseline hand signal then the device can implement the first button function. The user may customize the device by setting the baseline hand signal before use (e.g., calibration).

In another embodiment, the similarity between a baseline hand signal and a current hand signal may also indicate the user type (e.g., handedness of the user or the identity of the user). For example, if the baseline hand signal corresponds to a left hand user and the current hand signal is similar to the baseline hand signal then the device knows that the user is left handed. The user may customize the device by setting the baseline hand signal before use (e.g., calibration).

Figure 18:
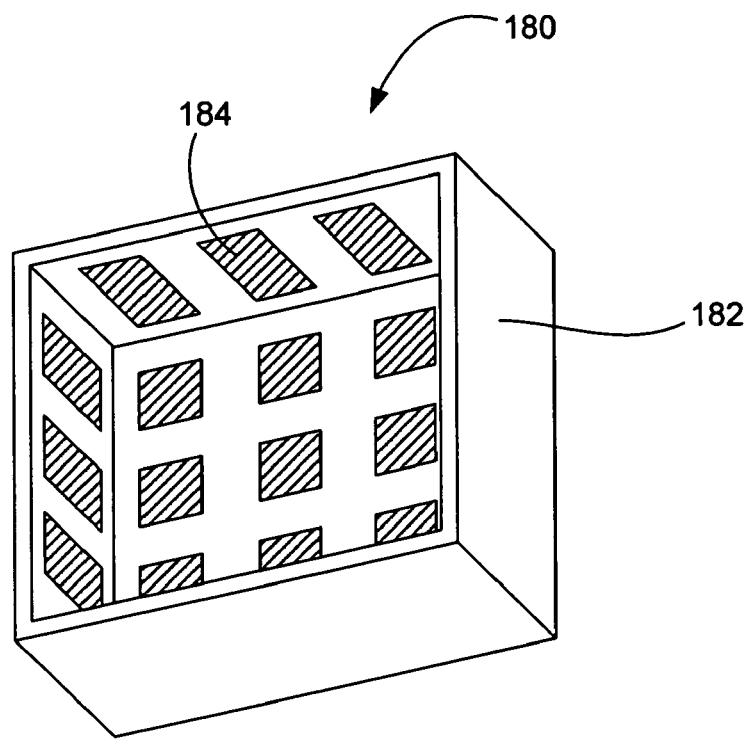
FIG. 18 is a diagram of the hand held electronic device, in accordance with another embodiment of the present invention.

FIG. 18 is a diagram of the hand held electronic device 180, in accordance with another embodiment of the present invention. In this embodiment, instead of using a two layer grid of spatially separated electrodes or wires as shown in FIG. 16, the device 180 includes a touch sensitive housing 182 having a plurality of spatially separated electrodes or platforms 184 that are positioned in the same layer and that are connected to the control system of the device 180. Each of the electrodes 184 generates a signal when an object nears the region of the housing 182 where the electrode is located. The signals may be used to perform actions similarly to those mentioned above.

Figure 19:
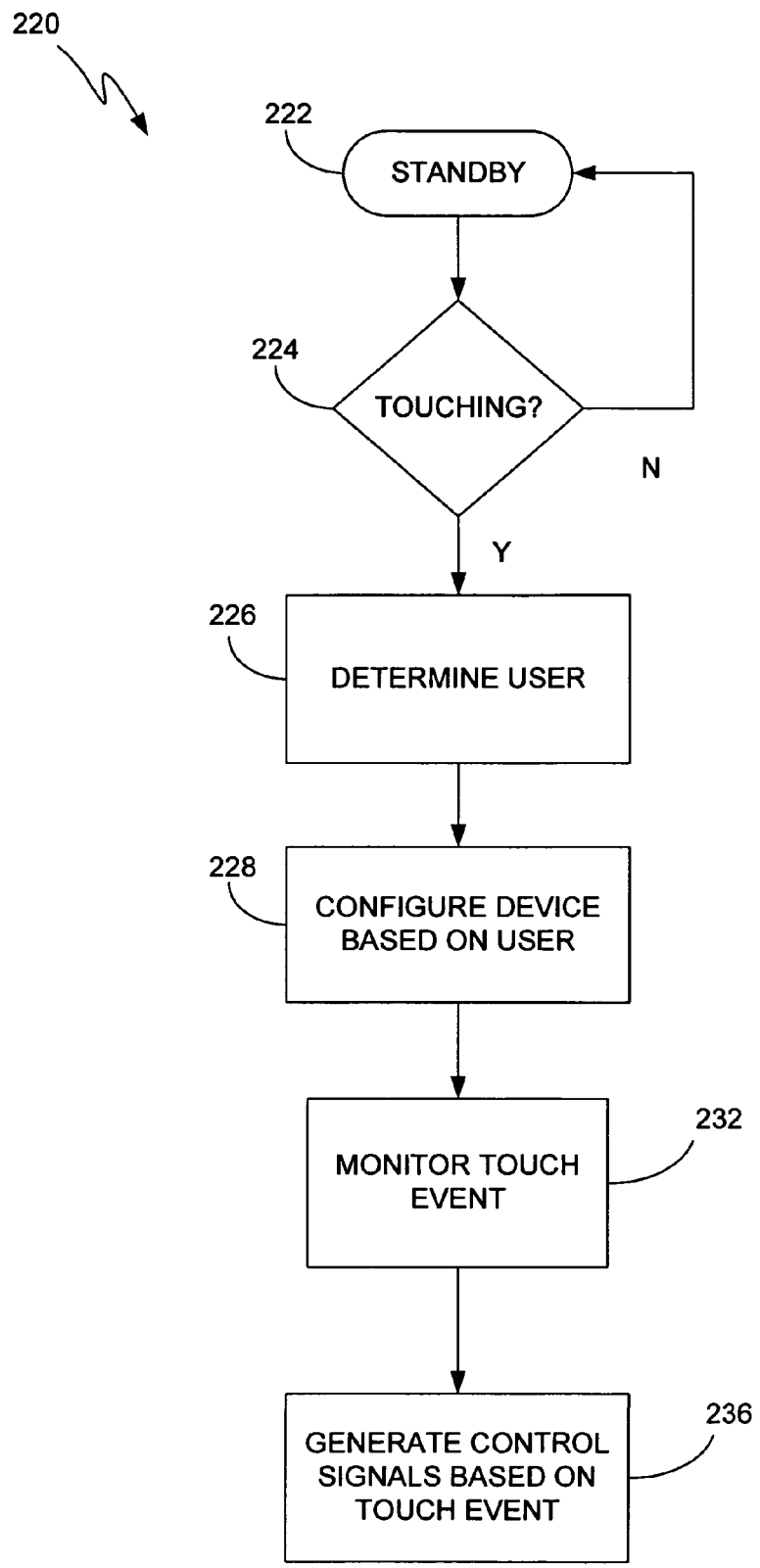
FIG. 19 is an operational method in accordance with one embodiment of the present invention.

FIG. 19 is an operational method 220 in accordance with one embodiment of the present invention. The method 220 generally begins at block 222 where the device is in standby. Standby generally implies that the device is in a state of readiness waiting for something to happen, i.e., a user initiating an action therewith. Following block 222, the process flow proceeds to block 224 where a determination is made as to whether the user is touching the device. This is generally accomplished with touch sensing device capable of generating signals when a hand nears the device and a control system configured to monitor the activity of the touch sensing device. If it is determined that the user is not touching the device, then the process flow proceeds back to block 222 thereby keeping the device in standby. If it is determined that the user is touching the device, then the process flow proceeds to block 226 where the user is determined.

In one embodiment, block 226 includes determining the handedness of the user. In another embodiment, block 226 includes determining the actual user (e.g., Bob or Carol). The determination may be performed automatically or it may be selective, i.e., user initiated. Once the user is determined, the process flow proceeds to block 228 where the device is configured based on the user. In one embodiment, the button zones of the device are configured based on the handedness of the user. In another embodiment, the button zones are configured based on the actual user (e.g., Bob or Carol).

Following block 228 the process flow proceeds to block 232, where touch events are monitored. Following block 232, the process flow proceeds to block 236 where signals are generated based on the touch event. The signals may be used to perform actions in the device. For example, the signals may be used to initiate commands, make selections or provide motion in the display (e.g., cursor control, scrolling, panning, etc.).

Figure 20:
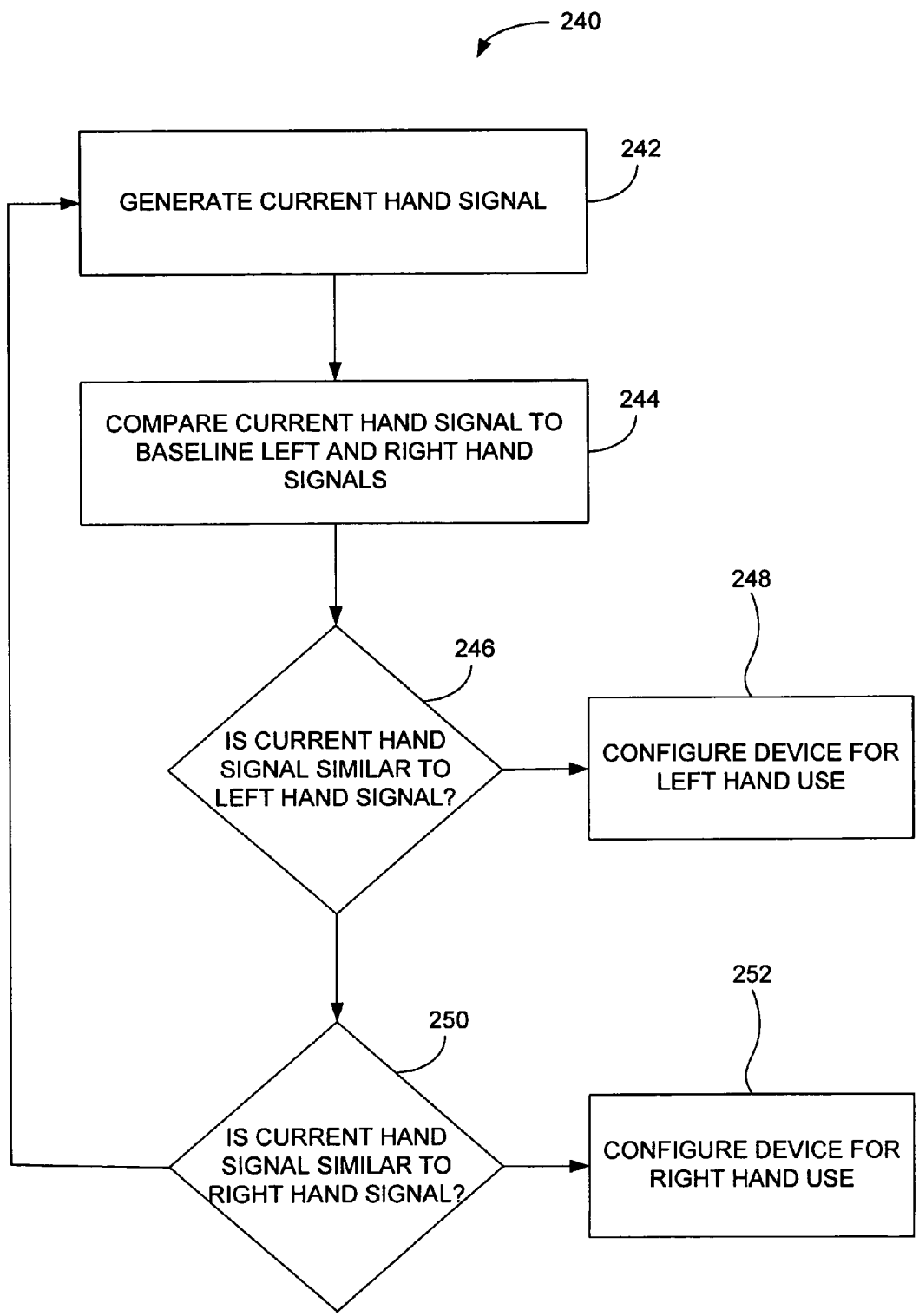
FIG. 20 is a handedness determination method, in accordance with one embodiment of the present invention.

FIG. 20 is a handedness determination method 240, in accordance with one embodiment of the present invention. By way of example, the method may be included in block 226 of FIG. 19. The method generally begins at block 242 where a current hand signal is generated. Following block 242 the process flow proceeds to block 244 where the current hand signal is compared to baseline left and/or right hand signals. Following block 244 the process flow proceeds to block 246 where a determination is made as whether the current hand signal is similar to the baseline left hand signal. If the current hand signal is similar, then the process flow proceeds to block 248 where the device is configured for left hand use. That is, the button zones are set for the left handed user. If the current hand signal is not similar to the left hand profile, then the process flow proceeds to block 250 where a determination is made as to whether the current hand signal is similar to a baseline right hand signal. If the current hand signal is similar then the process flow proceeds to block 252 where the device is configured for right hand use. If the current hand signal is not similar to the right hand profile then the process flow proceeds back to block 242 or in some cases one configuration may be chosen as a default (e.g., right hand may be the default)

Figure 21:
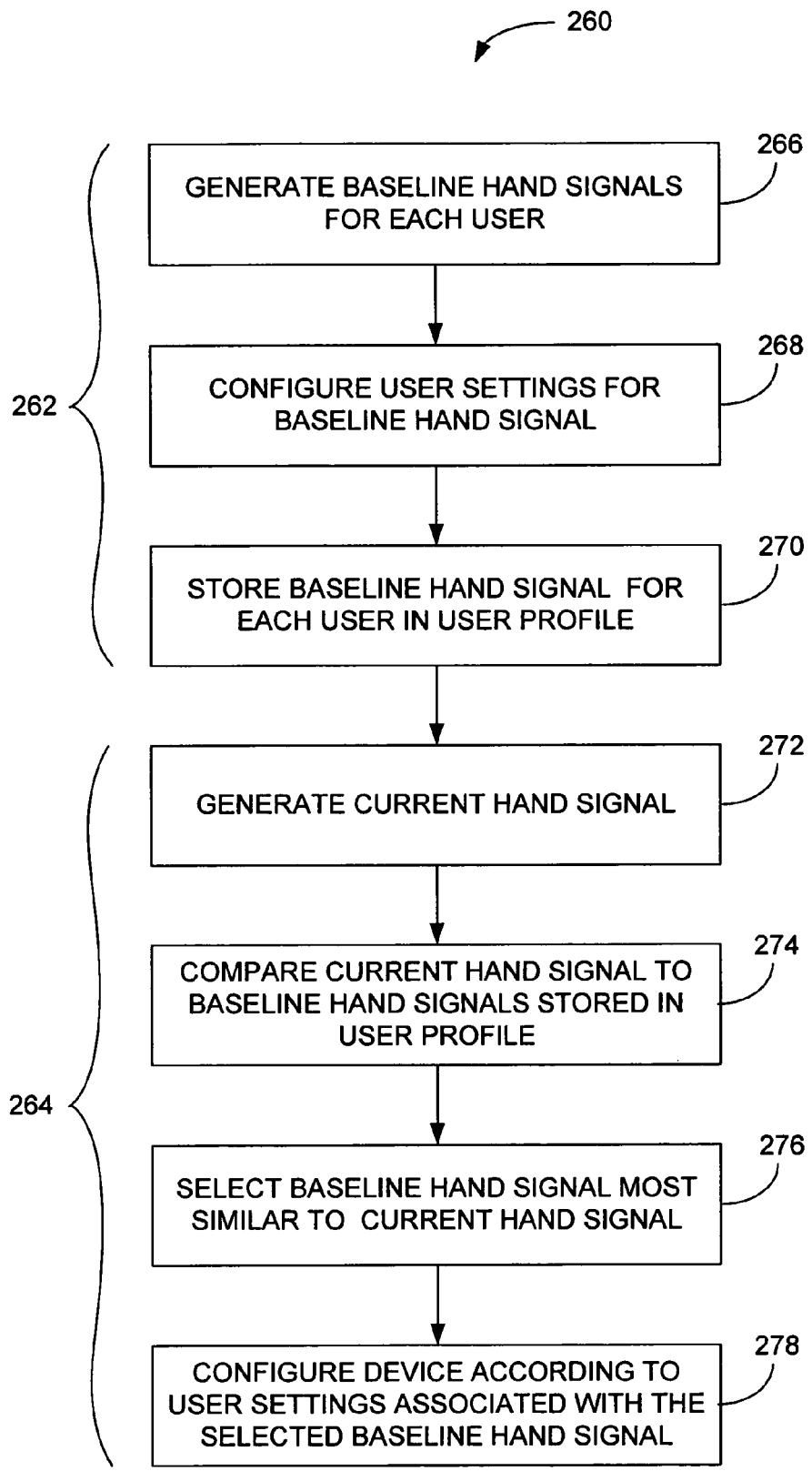
FIG. 21 is an actual user determination method, in accordance with one embodiment of the present invention.

FIG. 21 is an actual user determination method 260, in accordance with one embodiment of the present invention. By way of example, the method may be included in block 226 of FIG. 19. The method is generally performed in multiple steps including a calibration step 262 and an in use step 264. The calibration step 262 is performed before the use step 264. The calibration step is generally performed once while the use step is continuously used during device use. The calibration step 262 generally begins at block 266 where baseline hand signals are generated for each user. Following block 266 the process flow proceeds to block 268 where the user settings (e.g., button zones) for the baseline hand signal are configured. Following block 268, the process flow proceeds to block 270 where the baseline hand signal and user settings are stored in a user profile database.

The use step 264 generally begins at block at block 272 where a current hand signal is generated. Following block 272, the process flow proceeds to block 274 where the current hand signal is compared to the baseline hand signals stored in the user profile database. Following block 274, the process flow proceeds to block 276 where the baseline hand signal most similar to the current hand signal is selected. If there is no signal similar to the current signal then the user may be prompted to go through the calibration step 262. Following block 276, the process flow proceeds to block 268 where the device is configured according to the user settings associated with the selected baseline hand signal.

Figure 22:
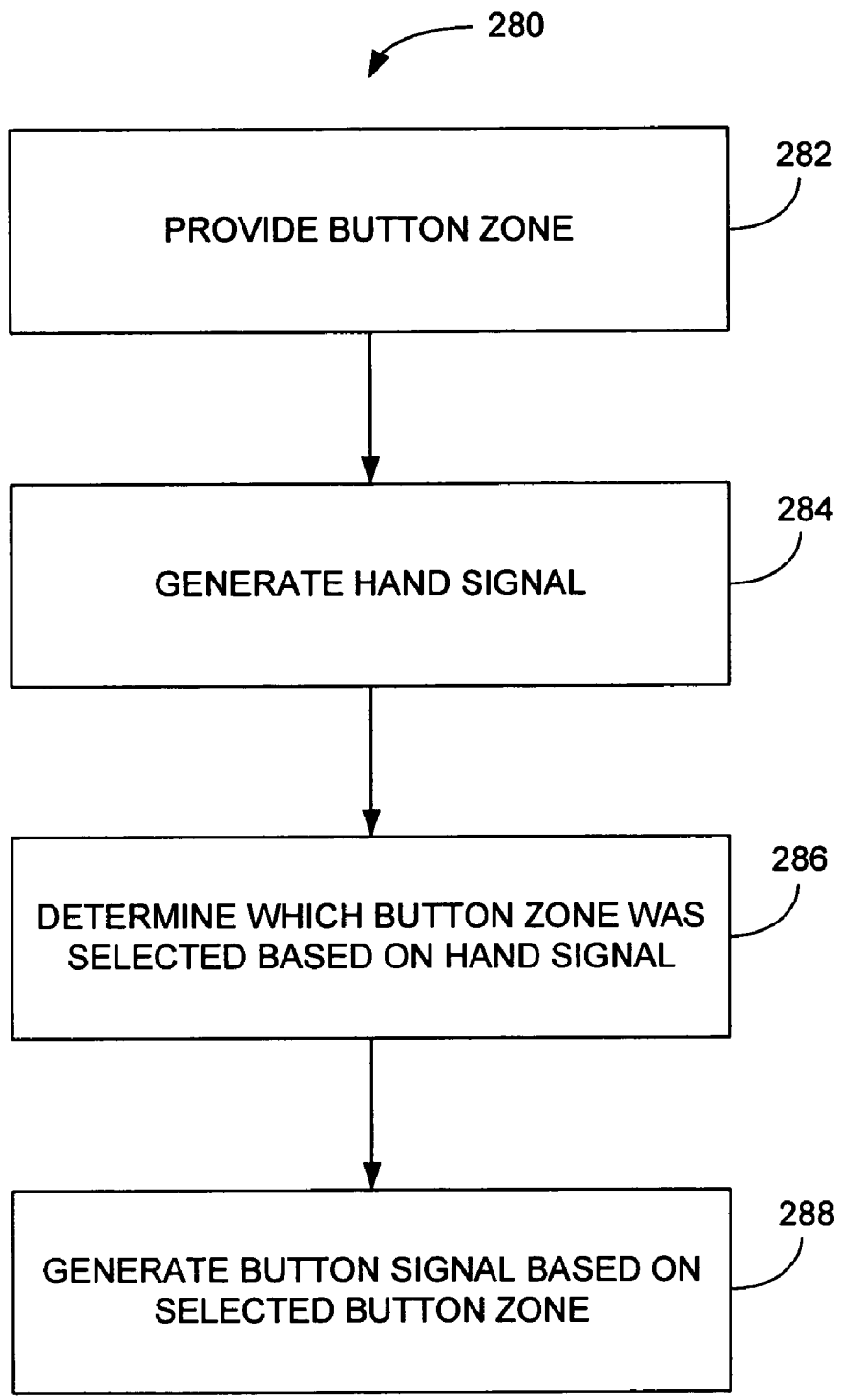
FIG. 22 is an absolute mapping method, in accordance with one embodiment of the present invention.

FIG. 22 is an absolute mapping method 280, in accordance with one embodiment of the present invention. By way of example, the method 280 may be included in block 232 of FIG. 19. The method 280 generally begins at block 282 where one or more button zones are provided. Button zones are area of the mouse that may be actuated by a user to implement an action. The button zones may be based on a training sequence, selected from a menu, or they may be preset. Following block 282 the process flow proceeds to block 284 where a hand signal is generated. Following block 284, the process flow proceeds to block 286 where a determination is made as to which button zone was selected based on the hand signal. For example, position coordinates generated by touch may correspond to a particular button zone. Following block 286, the process flow proceeds to block 288 where a button signal is generated based on the selected button zone.

Figure 23:
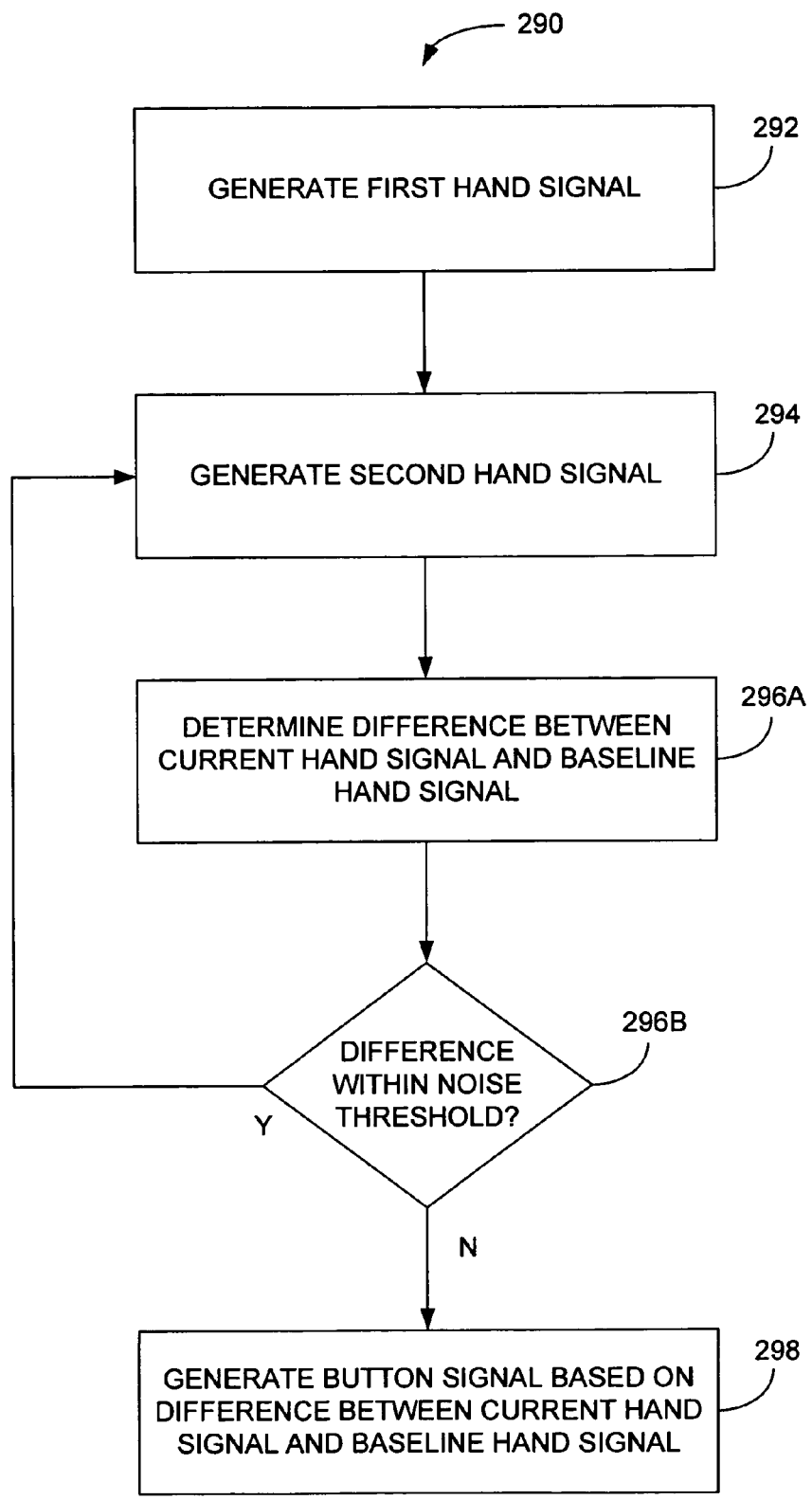
FIG. 23 is a relative mapping method, in accordance with one embodiment of the present invention.

FIG. 23 is a relative mapping method 290, in accordance with one embodiment of the present invention. By way of example, the method may be included in block 232 of FIG. 19. The method 290 generally begins at block 292 where a first hand signal is generated. Following block 292, the process flow proceeds to block 294 where a second hand signal is generated. In this embodiment, the first hand signal generally corresponds to a hand signal generated before the second hand signal. For example, the first hand signal may be the last hand signal while the second hand signal may be the current hand signal. Following block 294, the process flow proceeds to block 296 where the difference between the current hand signal and the baseline hand signal is determined. If the difference is within a threshold value, then the process flow proceeds back to block 294. This serves as a filter element or noise reduction. As should be appreciated, the user tends to continuously adjust hand position during use even if they are not making a selection (e.g., noise). If the difference is outside a threshold value then the process flow proceeds to block 298 where a button signal is generated based on the difference between the first hand signal and the second hand signal.

Figure 24:
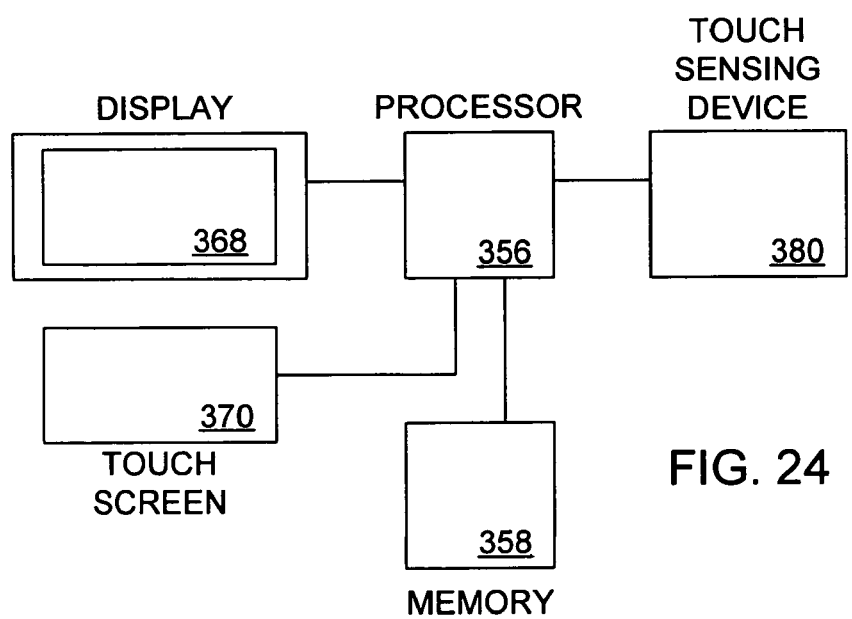
FIG. 24 is a block diagram of an exemplary electronic device, in accordance with one embodiment of the present invention.

FIG. 24 is a block diagram of an exemplary electronic device 350, in accordance with one embodiment of the present invention. The electronic device typically includes a processor 356 configured to execute instructions and to carry out operations associated with the electronic device 350. For example, using instructions retrieved for example from memory, the processor 356 may control the reception and manipulation of input and output data between components of the electronic device 350. The processor 356 can be implemented on a single-chip, multiple chips or multiple electrical components. For example, various architectures can be used for the processor 356, including dedicated or embedded processor, single purpose processor, controller, ASIC, and so forth.

In most cases, the processor 356 together with an operating system operates to execute computer code and produce and use data. The operating system may correspond to well known operating systems such as OS/2, DOS, Unix, Linux, and Palm OS, or alternatively to special purpose operating system, such as those used for limited purpose appliance-type devices (e.g., media players). The operating system, other computer code and data may reside within a memory block 358 that is operatively coupled to the processor 56. Memory block 358 generally provides a place to store computer code and data that are used by the electronic device 350. By way of example, the memory block 58 may include Read-Only Memory (ROM), Random-Access Memory (RAM), hard disk drive, flash memory and/or the like.

The electronic device 350 also includes a display 368 that is operatively coupled to the processor 356. The display 368 is generally configured to display a graphical user interface (GUI) that provides an easy to use interface between a user of the electronic device 350 and the operating system or application running thereon. The display 368 may for example be a liquid crystal display (LCD).

The electronic device 350 also includes a touch screen 370 that is operatively coupled to the processor 356. The touch screen 370 is configured to transfer data from the outside world into the electronic device 350. The touch screen 370 may for example be used to perform tracking and to make selections with respect to the GUI on the display 368. The touch screen 70 may also be used to issue commands in the electronic device 350.

The touch screen 370, which is positioned in front of the display 368, recognizes touches, as well as the position and magnitude of touches on a touch sensitive surface. The touch screen 370 reports the touches to the processor 356 and the processor 356 interprets the touches in accordance with its programming. For example, the processor 356 may initiate a task in accordance with a particular touch. A dedicated processor can be used to process touches locally and reduce demand for the main processor of the electronic device.

The touch screen 370 may be based on sensing technologies including but not limited to capacitive sensing, resistive sensing, surface acoustic wave sensing, and/or the like. Furthermore, the touch screen may be based on single point sensing or multipoint sensing. Single point sensing is capable of only distinguishing a single touch, while multipoint sensing is capable of distinguishing multiple touches that occur at the same time (multitouch sensing device).

The electronic device 350 also includes a touch sensing device 380 that is operatively coupled to the processor 356. The touch sensing device 380 is configured to transfer data from the outside world into the electronic device 350. The touch sensing device 380 may for example be used to perform tracking and to make selections with respect to the GUI on the display 368. The touch sensing device 380 may also be used to issue commands in the electronic device 350.

The touch sensing device 380, which is positioned in the housing, recognizes touches, as well as the position and magnitude of touches on a touch sensitive surface. The touch sensing device 380 reports the touches to the processor 356 and the processor 356 interprets the touches in accordance with its programming. For example, the processor 356 may initiate a task in accordance with a particular touch. A dedicated processor can be used to process touches locally and reduce demand for the main processor of the electronic device.

The touch sensing device may be based on sensing technologies including but not limited to capacitive sensing, resistive sensing, surface acoustic wave sensing, and/or the like. Furthermore, the touch sensing device may be based on single point sensing or multipoint sensing. Single point sensing is capable of only distinguishing a single touch, while multipoint sensing is capable of distinguishing multiple touches that occur at the same time (multitouch sensing device).

In one particular embodiment of the present invention, the electronic devices described above correspond to hand-held electronic devices with small form factors. As used herein, the term "hand held" means that the electronic device is typically operated while being held in a hand and thus the device is sized and dimension for such use. Examples of hand held devices include PDAs, Cellular Phones, Media players (e.g., music players, video players, game players), Cameras, GPS receivers, Remote Controls, and the like.

In cases such as these, the display presents the visual information associated with the hand held electronic device, while the touch sensitivity of the touch screen and touch sensing devices provide the input means necessary to interact with the hand held electronic device. The touch screen and touch sensing device can reduce the number of input devices needed to support the device and in many cases completely eliminate input devices other than the touch sensing devices. As a result, the hand held electronic device appears to only have a display and no input means. The device is therefore more aesthetically pleasing (e.g., smooth surface with no breaks gaps or lines), and in many cases can be made smaller without sacrificing screen size and input functionality, which is very beneficial for hand held electronic device especially those hand held electronic device that are operated using one hand (some hand held electronic device require two handed operation while others do not).

The multiple touch sensing devices of the present invention are a perfect fit for small form factor devices such as hand held devices, which have limited space available for input interfaces, and which require adaptable placement of input interfaces to permit operation while being carried around. This is especially true when you consider that the functionality of handheld devices have begun to merge into a single hand held device (e.g., smart phones). At some point, there is not enough real estate on the device for housing all the necessary buttons and switches without decreasing the size of the display or increasing the size of the device, both of which leave a negative impression on the user. In fact, increasing the size of the device may lead to devices, which are no longer considered "hand-held."

In one particular implementation, the hand held device is a music player and the display is configured to substantially fill the entire front surface of the music player. In this embodiment, the touch sensing devices are the primary input means of the music player and in some cases is the only input means. Furthermore, the touch sensing devices may configured to generate control signals associated with a music player. For example, the touch surface on the housing may include button functions including, Select, Play/Pause, Next, Previous and Menu. Alternatively or additionally, the button functions may include volume up and volume down.

In any of the embodiments described or contemplated by this specification, the touch sensing devices may be configured to provide visual information to indicate when and where the touches occur, to invoke a touch (location where a user should touch), or as otherwise programmed. In the case of a touchscreen, the visual information may be provided by the graphical display positioned behind the touchscreen. In the case of the touch sensitive housing, or touch pad (or possibly with the touchscreen), this may be accomplished with a visual feedback system that is capable of adjusting the visual stimuli of the touch surface.

The visual feedback system may include visual surface changing elements, which can be separate or integral with the sensing elements. In fact, the visual surface changing elements may be mapped to the sensor coordinates such that particular visual surface changing elements are tied to particular sensor coordinates. By way of example, the visual surface changing elements may be light devices such as light emitting diodes that illuminate the touch surface. For example, the light devices may be positioned in an array or matrix similarly to the sensing devices. Examples of illuminated surfaces can be found in U.S. patent Ser. Nos. 10/075, 964, 10/773,897 and 10/075,520, which are all herein incorporated by reference. Alternatively, the visual surface changing elements may be embodied as electronic inks or other color changing surfaces.

If used, this visual feedback feature allows the display of pop-up buttons and indicators around the touch surface, which can disappear when not in use or required, or glowing special effects that trace or outline a users fingers in contact with the touch surface, or otherwise provide visual feedback for the users of the device. In one implementation, the hand-held device is configured to sense one or more touches and provide visual feedback in the area of the touches. In another implementation, the handheld device is configured to provide visual feedback on the touch surface, detect a touch in the area of the visual feedback, and to perform an action that is associated with the visual feedback.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A handheld device, comprising:
   a sensor arrangement comprising a grid of capacitive sensing points configured to generate a pixilated image of a hand of a user in contact with the handheld device; and
   a controller configured to
      determine an identity of the user based on the pixilated image of the user's hand generated by the sensor arrangement, and
      configure the handheld device in response to the identity determination according to user settings stored in a user profile associated with the determined identity.

2. The handheld device as recited in claim 1 wherein the controller is configured to implement a button function based on relative mapping or absolute mapping.

3. The handheld device as recited in claim 2 wherein absolute mapping includes,
   providing one or more button zones;
   generating a hand signal;
   determining which button zone was selected based on the hand signal; and
   generating the button signal based on the selected button zone.

4. The handheld device as recited in claim 2 wherein relative mapping includes,
   generating a first hand signal;
   generating a second hand signal;
   determining the difference between the first and second hand signals; and
   generating the button signal based on the difference between the first and second hand signals.

5. The handheld device as recited in claim 1 wherein the user settings include button zones associated with the handheld device.

6. The handheld device as recited in claim 5 wherein the user settings include a size of one or more button zones to be employed by the configured handheld device.

7. The handheld device as recited in claim 5 wherein the user settings include a number of button zones to be employed by the configured handheld device.

8. The handheld device as recited in claim 5 wherein the user settings include a position of one or more button zones to be employed by the configured handheld device.

9. The handheld device as recited in claim 8 wherein the user settings specify that all button zones associated with the user settings are to be located on the back of the configured handheld device.

10. The handheld device as recited in claim 8 wherein the user settings specify that all button zones associated with the user settings are to be located on the front of the configured handheld device.

11. The handheld device as recited in claim 8 wherein the user settings specify that all button zones associated with the user settings are to be located on the side of the configured handheld device.

12. The handheld device as recited in claim 1 wherein the controller is configured to determine the identity of the user based on the pixilated image of the user's hand by
   generating a hand signal comprising the pixilated image, and
   comparing the generated hand signal against a baseline hand signal associated with the stored user profile.

* * * * *

UNITED STATES PATENT AND TRADEMARK OFFICE
CERTIFICATE OF CORRECTION

| | | |
|---|---|---|
| PATENT NO. | : 7,800,592 B2 | Page 1 of 1 |
| APPLICATION NO. | : 11/115539 | |
| DATED | : September 21, 2010 | |
| INVENTOR(S) | : Duncan R. Kerr et al. | |

It is certified that error appears in the above-identified patent and that said Letters Patent is hereby corrected as shown below:

In column 17, line 33, after "default)" insert -- . --.

Signed and Sealed this
Twenty-ninth Day of November, 2011

David J. Kappos
*Director of the United States Patent and Trademark Office*